US007609941B2

United States Patent
Matsukawa et al.

(10) Patent No.: US 7,609,941 B2
(45) Date of Patent: Oct. 27, 2009

(54) MULTIMEDIA DATA RECORDING APPARATUS, MONITOR SYSTEM, AND MULTIMEDIA DATA RECORDING METHOD

(75) Inventors: Takayuki Matsukawa, Tokyo (JP); Hiroaki Yoshio, Tokyo (JP); Fumi Kawai, Tokyo (JP)

(73) Assignee: Panasonic Corporation, Osaka (JP)

( * ) Notice: Subject to any disclaimer, the term of this patent is extended or adjusted under 35 U.S.C. 154(b) by 920 days.

(21) Appl. No.: 10/541,025

(22) PCT Filed: Oct. 20, 2004

(86) PCT No.: PCT/JP2004/015533

§ 371 (c)(1),
(2), (4) Date: Jun. 28, 2005

(87) PCT Pub. No.: WO2005/039174

PCT Pub. Date: Apr. 28, 2005

(65) Prior Publication Data

US 2006/0152636 A1      Jul. 13, 2006

(30) Foreign Application Priority Data

Oct. 20, 2003  (JP)  ............................. 2003-360012
Oct. 20, 2004  (JP)  ............................. 2004-306093

(51) Int. Cl.
  *H04N 5/76*  (2006.01)
  *H04N 7/00*  (2006.01)
  *H04N 5/00*  (2006.01)

(52) U.S. Cl. ........................... 386/94; 386/46; 386/125

(58) Field of Classification Search .................. 386/46, 386/94, 95; 348/143, 150, 156; 360/5
See application file for complete search history.

(56) References Cited

U.S. PATENT DOCUMENTS 5,671,009 A  *  9/1997  Chun .......................... 348/153

(Continued)

FOREIGN PATENT DOCUMENTS

JP          9-046636          2/1997

(Continued)

OTHER PUBLICATIONS

English Language Abstract of JP 2000-013745.

(Continued)

*Primary Examiner*—Thai Tran
*Assistant Examiner*—Gelek Topgyal
(74) *Attorney, Agent, or Firm*—Greenblum & Bernstein P.L.C.

(57) ABSTRACT

A multimedia data recording apparatus is disclosed that enables large-volume recorded data to be recorded for a long period in accordance with the importance of the data, by means of a simple configuration and simple processing, and without imposing a heavy load on the system. In this apparatus, a layer classification section classifies video data captured by a surveillance camera and input via a video processing section into a plurality of layers on a frame-by-frame basis according to importance. A data recording section assigns a file to each layer and records classified data in a data recording medium. If an information amount reduction section detects that the vacant capacity of the data recording medium has reached or fallen below a threshold value, it deletes a frame belonging to the lowest layer among the plurality of layers.

5 Claims, 39 Drawing Sheets

U.S. PATENT DOCUMENTS

| | | | | |
|---|---|---|---|---|
| 5,689,442 | A | * | 11/1997 | Swanson et al. ............ 380/241 |
| 6,700,487 | B2 | * | 3/2004 | Lyons et al. ................ 340/541 |
| 6,731,805 | B2 | * | 5/2004 | Brodsky et al. ............. 382/199 |
| 6,741,977 | B1 | * | 5/2004 | Nagaya et al. .................. 707/1 |
| 6,795,642 | B2 | * | 9/2004 | Matsumoto et al. ......... 386/109 |
| 6,798,909 | B2 | * | 9/2004 | Miyatake et al. ............ 382/190 |
| 6,987,528 | B1 | * | 1/2006 | Nagahisa et al. ............ 348/143 |
| 7,080,144 | B2 | * | 7/2006 | Boehmke .................... 709/225 |
| 2002/0015582 | A1 | | 2/2002 | Matsumoto et al. |
| 2002/0016185 | A1 | | 2/2002 | Yuzawa |
| 2002/0087624 | A1 | * | 7/2002 | Liebenow ................... 709/203 |
| 2003/0031458 | A1 | * | 2/2003 | Takahashi ................... 386/46 |
| 2003/0058341 | A1 | * | 3/2003 | Brodsky et al. ............. 348/169 |

FOREIGN PATENT DOCUMENTS

| | | |
|---|---|---|
| JP | 11-069298 | 3/1999 |
| JP | 2000-013745 | 1/2000 |
| JP | 2001-268022 | 9/2001 |
| JP | 2002-044609 | 2/2002 |
| JP | 2002-093119 | 3/2002 |

OTHER PUBLICATIONS

English Language Abstract of JP 9-046636.
English Language Abstract of JP 11-069298.
English Language Abstract of JP 2002-044609.
English Language Abstract of JP 2002-093119.
English Language Abstract of JP 2001-268022.

* cited by examiner

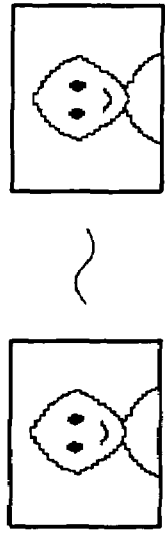
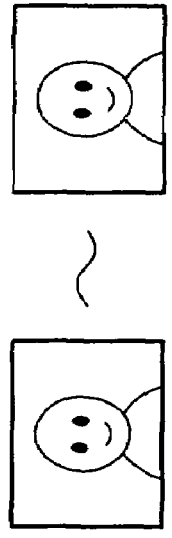
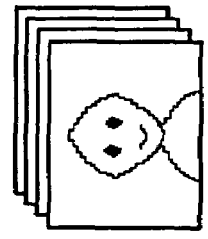
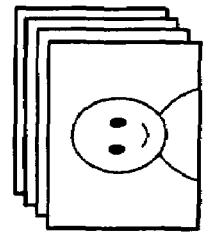
FIG.12A ENHANCEMENT LAYER DELETION (A BASE LAYER ONLY)
FIG.12B MOTION IMPROVING ENHANCEMENT LAYER DELETION (A+B)
FIG.12C IMAGE QUALITY IMPROVING ENHANCEMENT LAYER DELETION (A+C)
FIG.12D DATA AT TIME OF RECORDING (A+B+C)
FIG.12

| SURVEILLANCE DATA | D521 | D522 | D523 | D524 | D525 | D526 | D527 |
|---|---|---|---|---|---|---|---|
| MOVING SUBJECT | ABSENT | PRESENT | PRESENT | PRESENT | PRESENT | PRESENT | PRESENT |
| EVENT | ABSENT | ABSENT | ABSENT | ENTRY | CONTINU-OUS PRESENCE | ABSENT | ABSENT |

| ID | 1 | | ID | 2 | | ID | 3 | |
|---|---|---|---|---|---|---|---|---|
| TIME | 10:10:00 | | TIME | 10:10:05 | | TIME | 10:10:10 | |
| PROTECTED LAYER | NONE | | PROTECTED LAYER | NONE | | PROTECTED LAYER | NONE | |
| MOVING SUBJECT | ABSENT | | MOVING SUBJECT | PRESENT | | MOVING SUBJECT | PRESENT | |
| EVENT | ABSENT | | EVENT | ABSENT | | EVENT | ABSENT | |
| LAYER A | | | LAYER A | | | LAYER A | | |
| LAYER B | | | LAYER B | | | LAYER B | | |
| LAYER C | | | LAYER C | | | LAYER C | | |

| ID | 2 |
|---|---|
| TIME | 10:10:05 |
| PROTECTED LAYER | A,B |
| MOVING SUBJECT | PRESENT |
| EVENT | ABSENT |
| LAYERSA | |
| LAYERSB | |
| LAYERSC | ☒ |

| ID | 3 |
|---|---|
| TIME | 10:10:10 |
| PROTECTED LAYER | A,B |
| MOVING SUBJECT | PRESENT |
| EVENT | ABSENT |
| LAYERSA | |
| LAYERSB | |
| LAYERSC | ☒ |

| ID | 4 |
|---|---|
| TIME | 10:10:15 |
| PROTECTED LAYER | A,B |
| MOVING SUBJECT | PRESENT |
| EVENT | ENTRY |
| LAYERSA | |
| LAYERSB | |
| LAYERSC | ☒ |

...

| ID | 64 |
|---|---|
| TIME | 10:15:15 |
| PROTECTED LAYER | A,B |
| MOVING SUBJECT | PRESENT |
| EVENT | CONTINUOUS PRESENCE |
| LAYERSA | |
| LAYERSB | |
| LAYERSC | ☒ |

MULTIMEDIA DATA RECORDING APPARATUS, MONITOR SYSTEM, AND MULTIMEDIA DATA RECORDING METHOD

TECHNICAL FIELD

The present invention relates to a multimedia data recording apparatus and multimedia data recording method used in a monitoring system or the like.

BACKGROUND ART

In locations requiring all-night or all-day surveillance, such as the strong rooms of financial institutions or places used to store important confidential industrial information, or to give a more familiar example, ATMs (automated teller machines) installed in banks and various kinds of retail outlets including convenience stores, a surveillance camera, sound-collecting microphone, and so forth, are set up near whatever is being monitored, and multimedia data such as continuously captured video data and voice data can be checked ex post facto when necessary. With this kind of surveillance system, the above-described operation is implemented by storing captured video data, voice data, and the like, on a storage medium (recording medium) such as a hard disk at regular intervals, and reading that data when necessary.

Recently, due to the deteriorating public safety situation in Japan, a trend has appeared of increasing the locations monitored by surveillance systems, with surveillance cameras being installed in such places as railway stations, shopping malls, and unmanned warehouses with no inward or outward movement of goods. A common characteristic of these surveillance systems is that, since the objects monitored span a wide range, it has become necessary to install a plurality of surveillance cameras and so forth, and surveillance systems have become larger in scale. The need for higher precision of surveillance data has also increased, and improvements have generally come to be made in video data resolution and voice data quality. There has thus been a marked increase in the quantity of surveillance data recorded as compared with the situation heretofore.

However, as there are limits to the capacity of recording media, in order to perform fixed-period storage of video and other multimedia data, it is necessary for data recorded in the past to be erased after the elapse of a fixed period or when the vacant recording medium capacity becomes insufficient, and for new data to be recorded in that vacant space, or for surveillance data to continue to be stored endlessly (hereinafter referred to as "endless recording") by sequentially overwriting old data with new data.

One conventional multimedia data recording apparatus is a video recording apparatus that makes it possible to maintain the quality of important video, and also to record video information for a long period on a medium of limited storage capacity, by storing video information whose quality the user wants to ensure in uncompressed form, and storing other video information in compressed form (see Patent Document 1, for example). This video recording apparatus records video information on a video recording medium, records the occurrence of a burglary, robbery, traffic accident, fire, or similar incident (hereinafter referred to generically as an "event") on the video recording medium, and increases the available recording medium capacity by reading from the video recording medium, from among the video information recorded on the recording medium, video information unrelated to an event, and compressing and rerecording that read video information.

When an event occurs, both recorded data of the event (hereinafter referred to as "event data"), and also data immediately prior to the occurrence of the event (hereinafter referred to as "pre-event data"), are important as material for identifying the cause of the event. One multimedia data recording apparatus that performs recording of pre-event data (hereinafter referred to as "prerecording" or "pre-event recording") is a surveillance image recording apparatus that saves pre-event data in an area separate from the normal recording area (see Patent Document 2, for example). By saving (copying) pre-event data, this apparatus prevents important surveillance data from being erased after the elapse of a fixed period.

Patent Document 1: Unexamined Japanese Patent Publication No. 2000-13745
Patent Document 2: Unexamined Japanese Patent Publication No. HEI 9-46636

DISCLOSURE OF INVENTION

Problems to be Solved by the Invention

However, a problem with the conventional multimedia data recording apparatus shown in Patent Document 1 is that a heavy load is imposed on the system because, when vacant capacity becomes insufficient, secondary manipulation processing (processing in parallel with recording processing) is performed whereby, while video data output from a monitor or the like is constantly stored in memory, data unrelated to an event is simultaneously compressed and rerecorded. A large system load also means that the circuit scale of this multimedia data recording apparatus itself is large.

Also, a problem with the conventional multimedia data recording apparatus shown in Patent Document 2 is that, when pre-event data is long-duration or high-definition data, the amount of data saved (copied) increases, the time necessary for processing and the system load also increase, large-capacity memory with high-speed access capability becomes necessary as the recording medium for saving pre-event data, and system costs rise.

It is an object of the present invention to provide a multimedia data recording apparatus and multimedia data recording method that enable large-volume recorded data used in a monitoring system or the like to be recorded for a long period in accordance with the importance of the data, by means of a simple configuration and simple processing, and without imposing a heavy load on the system.

Means for Solving the Problem

In accordance with one aspect of a multimedia data recording apparatus of the present invention, a configuration is employed that includes a recording section that continuously records multimedia data in memory, and a data amount reduction section that, when the vacant capacity of the memory is at or below a threshold value, takes older data or less important data among the data recorded in the memory as its object, and reduces the amount of this data.

In accordance with another aspect of a multimedia data recording apparatus of the present invention, a configuration is employed wherein, in the above-described configuration, the recording section records the multimedia data classified into a plurality of hierarchical layers according to the data contents or data precision.

In accordance with yet another aspect of a multimedia data recording apparatus of the present invention, a configuration is employed wherein, in the above-described configuration, when the vacant capacity of the memory is at or below a threshold value, the data amount reduction section deletes data in order starting with data recorded in a lower layer of the hierarchical layers.

That is to say, according to the present invention, when multimedia data is recorded, this data is recorded classified into hierarchical layers based on its importance, and when there is little remaining vacant recording medium capacity, the data amount (information amount) is reduced in order from a low layer. Here, important data denotes data requiring long-term storage, data requiring high-definition image quality, high-frame-rate data, data related to an alarm by means of an external sensor, and so forth.

According to these configurations, large-volume monitoring data, for example, is recorded classified into hierarchical layers according to the importance of that data. Then, when little vacant memory (recording medium) capacity remains, deletion is performed in order starting with low-layer data— that is, data of low importance. Thus, large-volume data can be recorded for a long period according to its importance, by means of a simple configuration and simple processing, without imposing a heavy load on a monitoring system or the like.

In accordance with a still further aspect of a multimedia data recording apparatus of the present invention, a configuration is employed wherein, in the above-described configuration, the data amount reduction section performs deletion in order starting with older data among the data recorded in a lower layer.

According to this configuration, when deletion is performed in order starting with lower-layer data, deletion is performed in order starting with old data within one particular layer. Thus, looking at recorded data overall without awareness of layers, a greater amount of information is deleted the older the data is, while the amount of information of new data is maintained. That is to say, the degree of deletion of the amount of information varies according to the age of the data. This means that, while simultaneously considering the two criteria of "data importance" and "data age," data of low importance is made subject to deletion first. At this time, the overall amount of recorded data can be reduced while maintaining a high-precision state for new data.

In accordance with a still further aspect of a multimedia data recording apparatus of the present invention, a configuration is employed wherein, in the above-described configuration, the recording section records the multimedia data classified in a hierarchical structure composed of a plurality of segments set according to the time of acquisition of this data, and a plurality of layers that belong to each segment and are set according to data contents or data precision; and the data amount reduction section selects a segment whose time of acquisition is older, and performs deletion in order starting with data recorded in a lower layer within this segment.

According to this configuration, a segment subject to deletion is first selected based on the age of the time of recording, and then a layer in which data of lower importance is recorded is deleted within that segment. Thus, looking at recorded data overall without awareness of layers, a greater amount of information is deleted the older the data is, while the amount of information of new data is maintained. That is to say, the degree of deletion of the amount of information varies according to the age of the data. This means that, while simultaneously considering the two criteria of "data importance" and "data age," old data is made subject to deletion first. At this time, the overall amount of recorded data can be reduced while maintaining a high-precision state for new data.

Advantageous Effect of the Invention

The present invention enables large-volume recorded data in a monitoring system or the like to be recorded for a long period in accordance with the importance of the data, by means of a simple configuration and simple processing, and without imposing a heavy load on the system.

BRIEF DESCRIPTION OF DRAWINGS

FIG. 12 is a drawing for explaining differences in image quality when FGS data divided into layers is played back;

FIG. 27 is a series of drawings for explaining a concrete example of a data hierarchical structure composed of segments and layers;

FIG. 28 is a series of drawings for explaining a concrete example of a data hierarchical structure composed of segments and layers;

FIG. 33 is a series of drawings for explaining a concrete example of a data hierarchical structure composed of segments and layers;

BEST MODE FOR CARRYING OUT THE INVENTION

Embodiments of the present invention will now be described in detail with reference to the accompanying drawings. In Embodiments 1 through 5, cases where a multimedia data recording apparatus according to the present invention is applied to a surveillance system are described by way of example. However, multimedia data recording apparatuses according to Embodiments 1 through 5 can also be applied to a more general monitoring system. Thus, in Embodiments 6 and 7, cases where a multimedia data recording apparatus according to the present invention is applied to a monitoring system are described by way of example.

Embodiment 1

Figure 1:
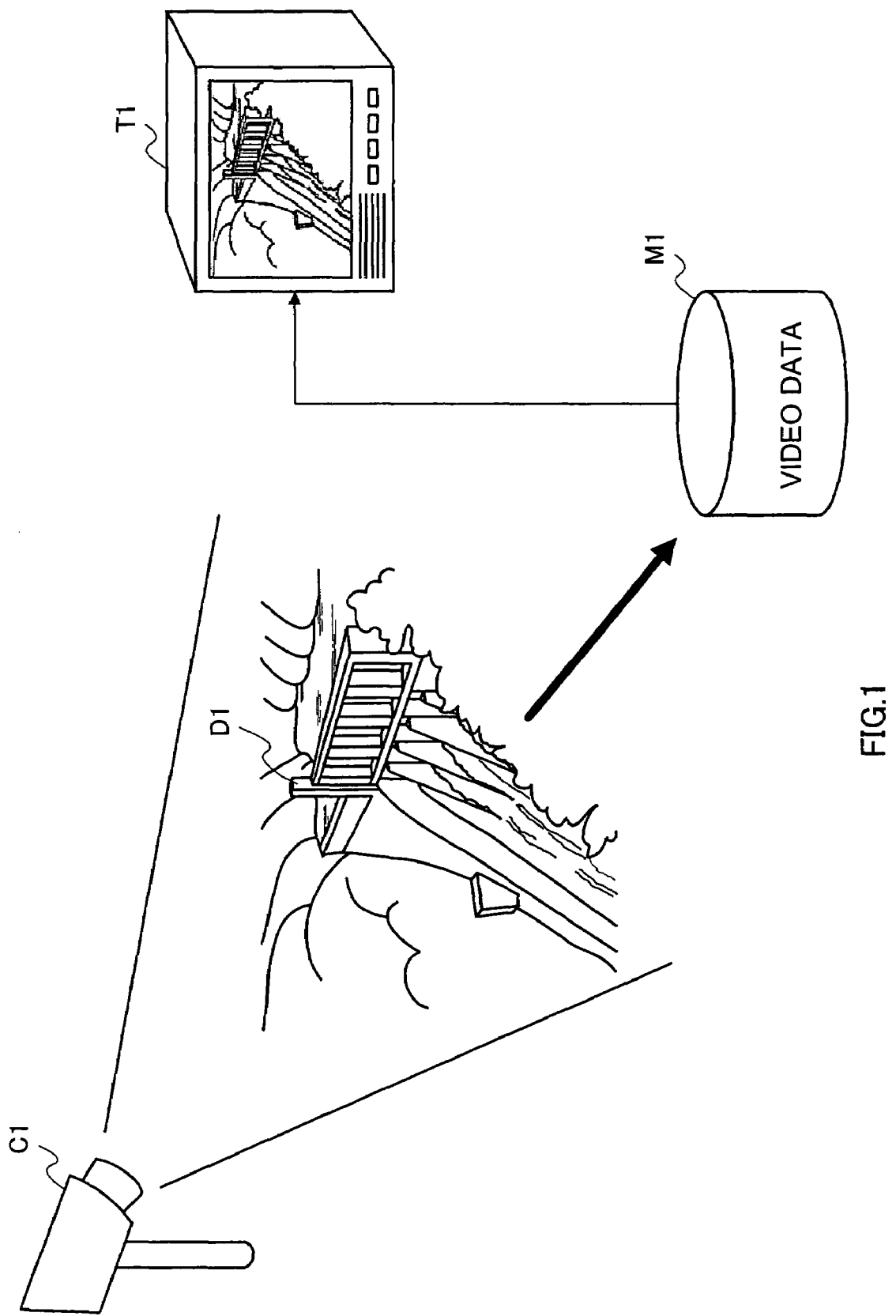
FIG. 1 is a drawing for explaining the installation environment of a surveillance system according to Embodiment 1.

FIG. 1 is a drawing for explaining the installation environment of a surveillance system according to Embodiment 1 of the present invention.

In a surveillance system according to this embodiment, it is assumed that the subject monitored is a dam D1, and one wide-angle camera (surveillance camera C1) is installed and monitors a wide area. Captured video data is stored in a recording medium M1, and is output to and displayed on a display terminal T1 as necessary. Characteristics of the object of surveillance by this system are that there is normally virtually no movement, and if there is movement, it is slow. Objects of surveillance that have similar characteristics include power generation plants, rivers, the open sea, and so forth.

Figure 2:
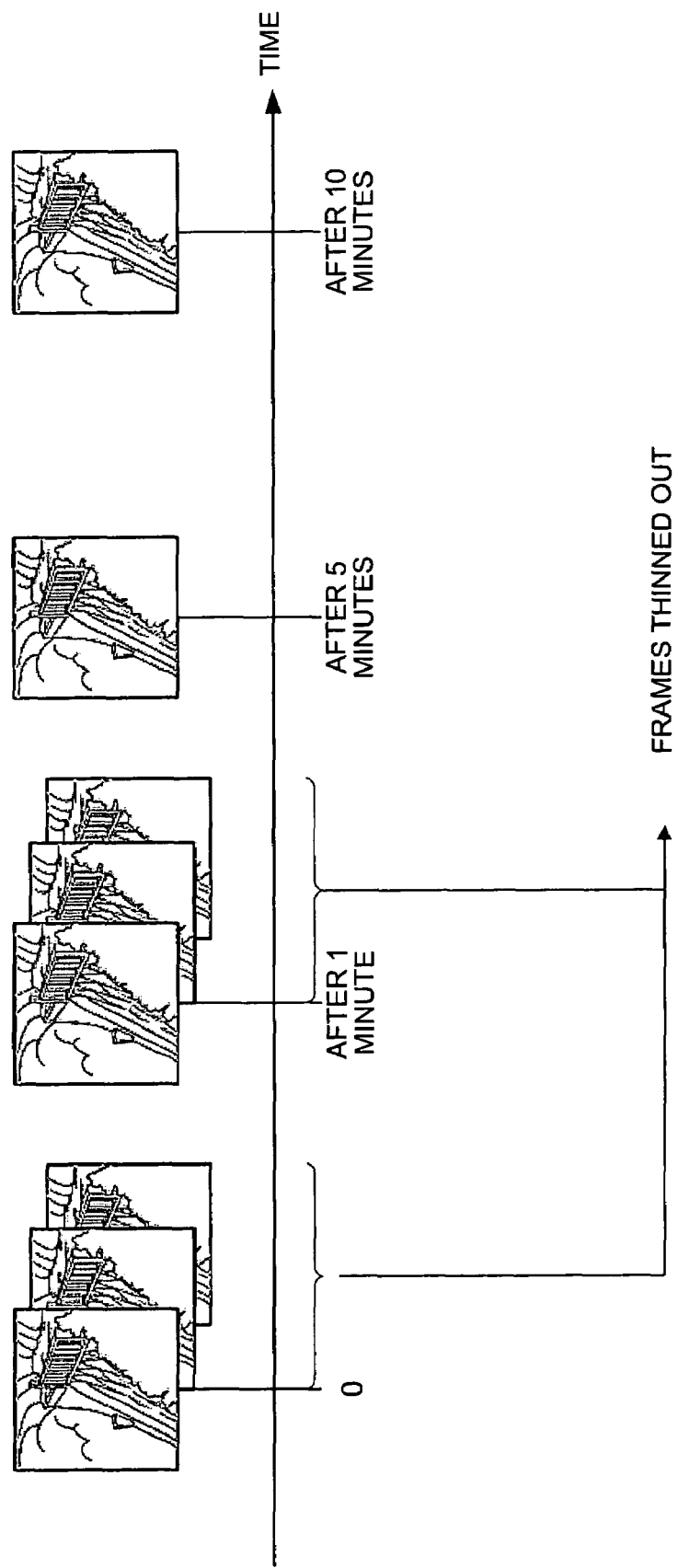
FIG. 2 is a drawing showing a concrete example of recorded data recorded by means of a surveillance system according to Embodiment 1.

FIG. 2 is a drawing showing a concrete example of recorded data recorded by means of a surveillance system according to this embodiment.

As the object of surveillance of this surveillance system is characterized by virtually no movement, or slow movement if there is movement, as described above, recorded data essentially merely comprises a large number of identical still images, as shown in the drawing, even though the data is moving-image data.

Thus, in this embodiment, all surveillance data is once stored in recording medium M1. Then, in view of the characteristics of the object of surveillance, when little vacant capacity remains, frame thinning-out (frame rate reduction) processing is executed on old video, and a high frame rate used in recording is maintained for new video.

Even video that has undergone frame thinning-out in this way is adequate for determining an overview of the object of surveillance. Also, since there are many cases where recorded video fulfills its role adequately as surveillance data even if comprising still images rather than moving images, it is acceptable for a still image to be formed in effect through excessive thinning-out of frames.

It is assumed here that a JPEG or similar format is used as the recorded video data format. That is to say, it is assumed that the data is coded using a coding method that enables compression within a frame. Also, voice data is here assumed to be nontarget data, since speech will become discontinuous if subjected to frame thinning-out.

Figure 3:
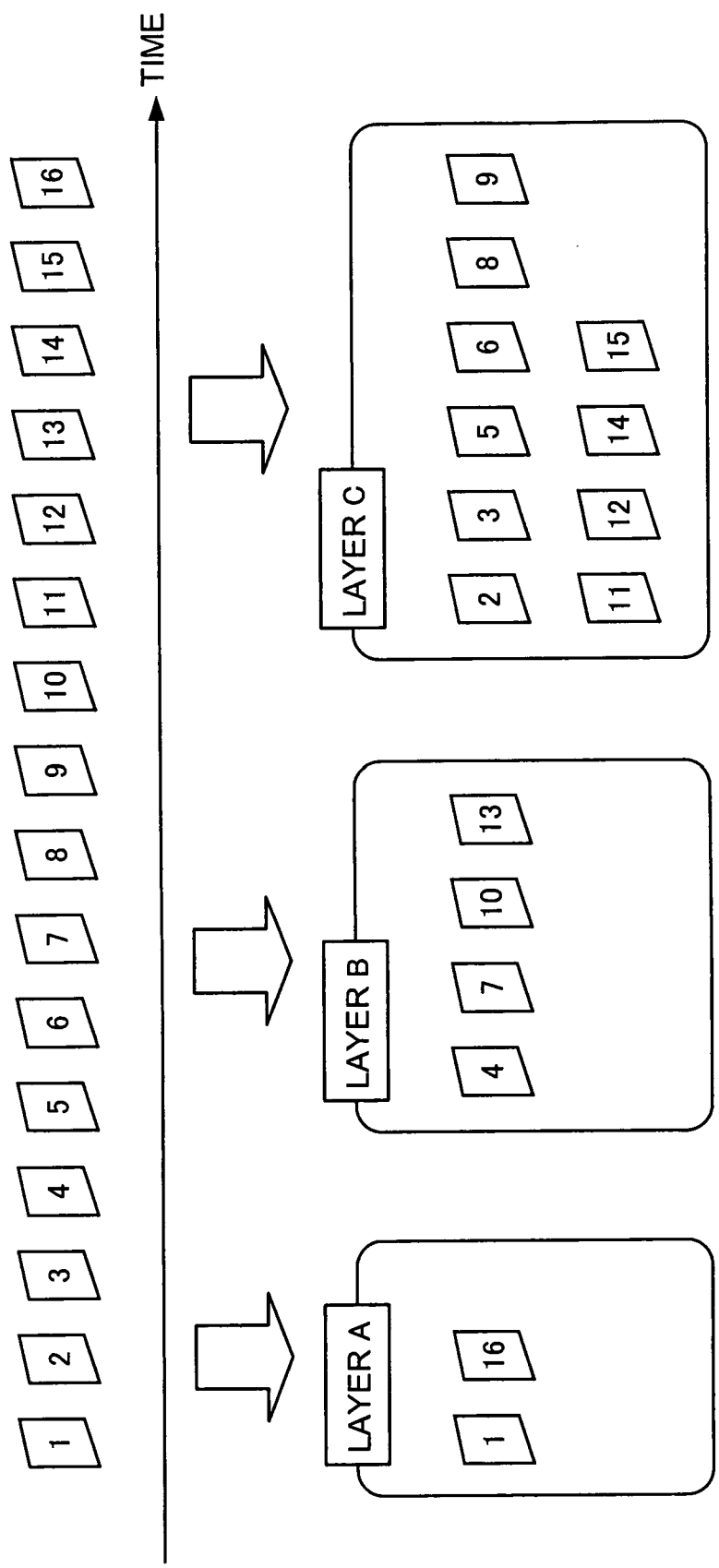
FIG. 3 is a drawing showing a concrete example of frame data that undergoes division into layers on a frame-by-frame basis.

FIG. 3 is a drawing showing a concrete example of frame data that undergoes division into layers on a frame-by-frame basis.

Each frame data unit (in this drawing, frames 1 through 16) undergoes division into layers according to its position on the time axis. To be specific, taking frame 1 as the base frame, subsequent frames separated by a 15-frame cycle (frames 1, 16, 31, . . . ) are grouped in layer A. Also, frames separated from frame 1 by a 3-frame cycle (frames 4, 7, 10, . . . ) are grouped in layer B, and frame data belonging to neither layer A nor layer B is grouped in layer C.

Thus, the frame rate when recorded data playback is performed using all the frame data contained in layers A through C can be designated $\alpha$ (fps), the frame rate when playback is performed using all the frame data contained in layers A and B can be designated $\beta$ (fps), and the frame rate when playback is performed using only the frame data contained in layer A can be designated $\gamma$ (fps) (where $\alpha>\beta>\gamma$). That is to say, the frame rate for playing back recorded data increases in the order: layer C, layer B, layer A.

Figure 4:
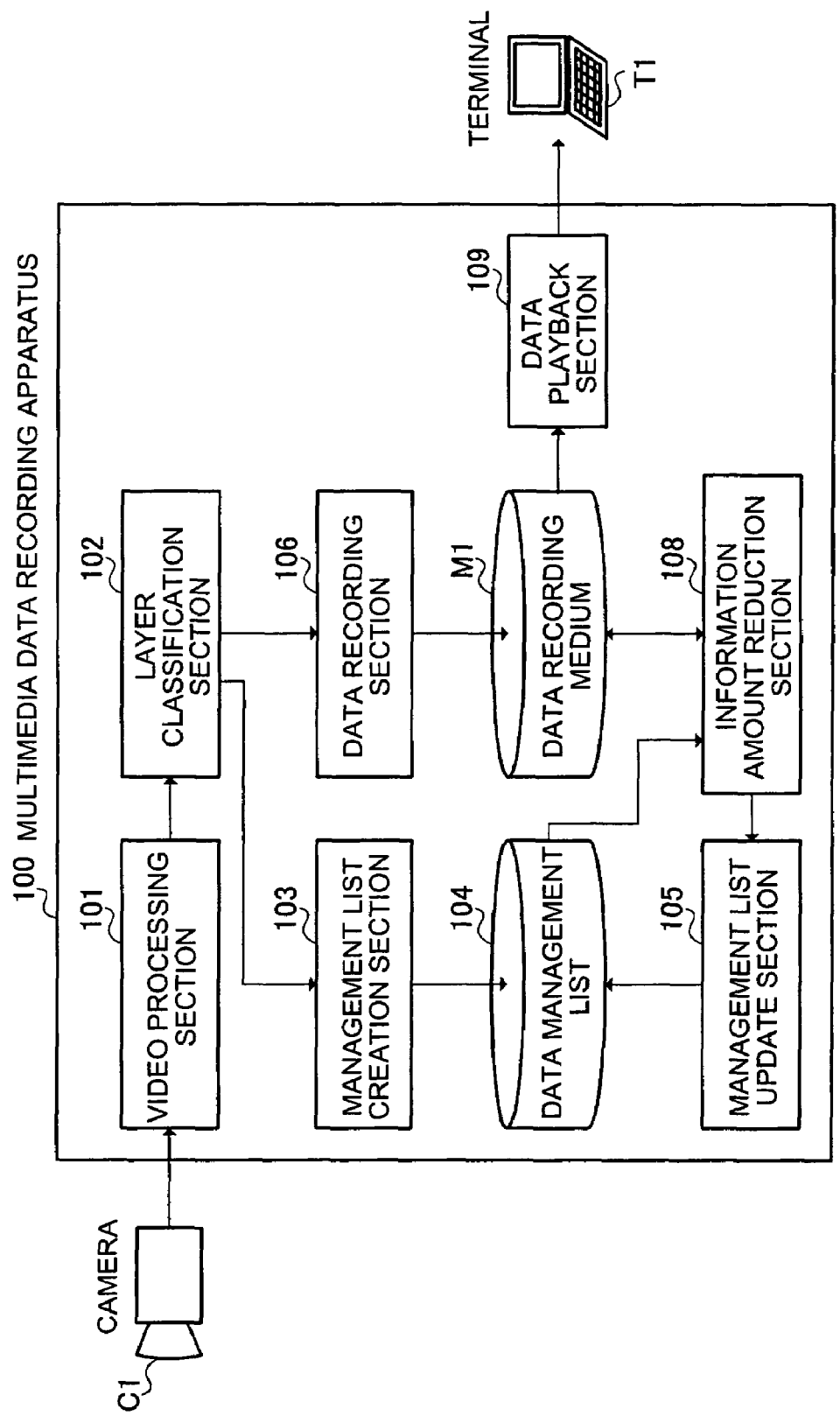
FIG. 4 is a block diagram showing the main configuration of a multimedia data recording apparatus according to Embodiment 1.

FIG. 4 is a block diagram showing the main configuration of a multimedia data recording apparatus 100 according to this embodiment that makes the above-described operation possible.

Multimedia data recording apparatus 100 has a video processing section 101, layer classification section 102, management list creation section 103, data management list 104, management list update section 105, data recording section 106, information amount reduction section 108, data playback section 109, and data recording medium M1.

Video processing section 101 executes predetermined video processing on video data captured by surveillance camera C1, and outputs the resulting data to layer classification section 102. Layer classification section 102 classifies data output from video processing section 101 into a plurality of layers on a frame-by-frame basis according to importance. Data recording section 106 assigns a file to each layer, and records in order starting at the start address of data recording medium M1. Data playback section 109 reads data from data recording medium M1 as necessary, and plays back this data via terminal T1. Meanwhile, management list creation section 103 arranges the correspondences between layers and frames decided by layer classification section 102 in list form, and stores these in data management list 104.

If information amount reduction section 108 detects that the vacant capacity of data recording medium M1 has reached or fallen below a threshold value, it deletes a frame belonging to the lowest layer among the plurality of layers. Management list update section 105 is notified by information amount reduction section 108 as to which layer's data has been deleted from data recording medium M1, and based on this, updates the correspondences between layers and frames recorded in data management list 104.

Figure 5:
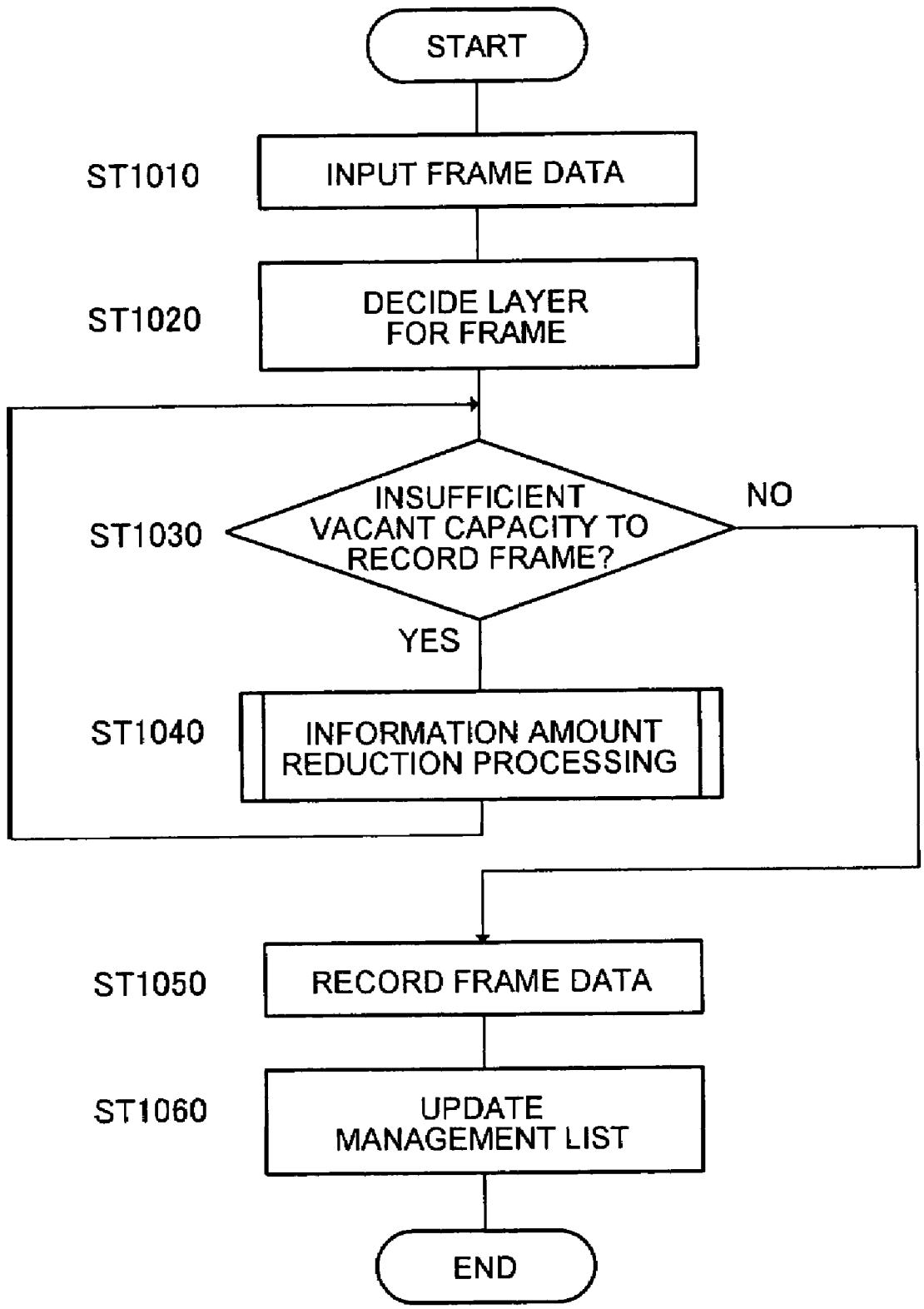
FIG. 5 is a flowchart showing the main procedure of data recording processing according to Embodiment 1.

Next, the main procedure of data recording processing by a multimedia data recording apparatus with the above-described configuration will be described using the flowchart shown in FIG. 5.

Video data captured by surveillance camera C1 is input to layer classification section 102 via video processing section 101 (ST1010). The input video data is classified into a plurality of layers on a frame-by-frame basis according to importance (ST1020). For example, assuming that data is divided among three layers, A through C, if frames are input in 1, 2, 3, 4, 5, 6, ... order, frame 1 is classified as a layer A frame, frame 2 as a layer B frame, and so on.

If there is sufficient vacant capacity to record the above frames in data recording medium M1 (ST1030), data recording section 106 records this frame data in data recording medium M1 (ST1050). Management list creation section 103 lists the correspondences between layers and frames decided by layer classification section 102, and stores these in data management list 104 (ST1060).

On the other hand, if there is not sufficient vacant capacity to record the above frames in data recording medium M1 (ST1030), information amount reduction section 108, which constantly monitors the vacant capacity of data recording medium M1, selects one layer that meets a predetermined condition from the plurality of existing layers, and performs deletion in order starting with the frame with the oldest time of recording belonging to that layer (ST1040). The processing in ST1040 is repeated until vacant capacity of the predetermined value or more is secured.

Figure 6:
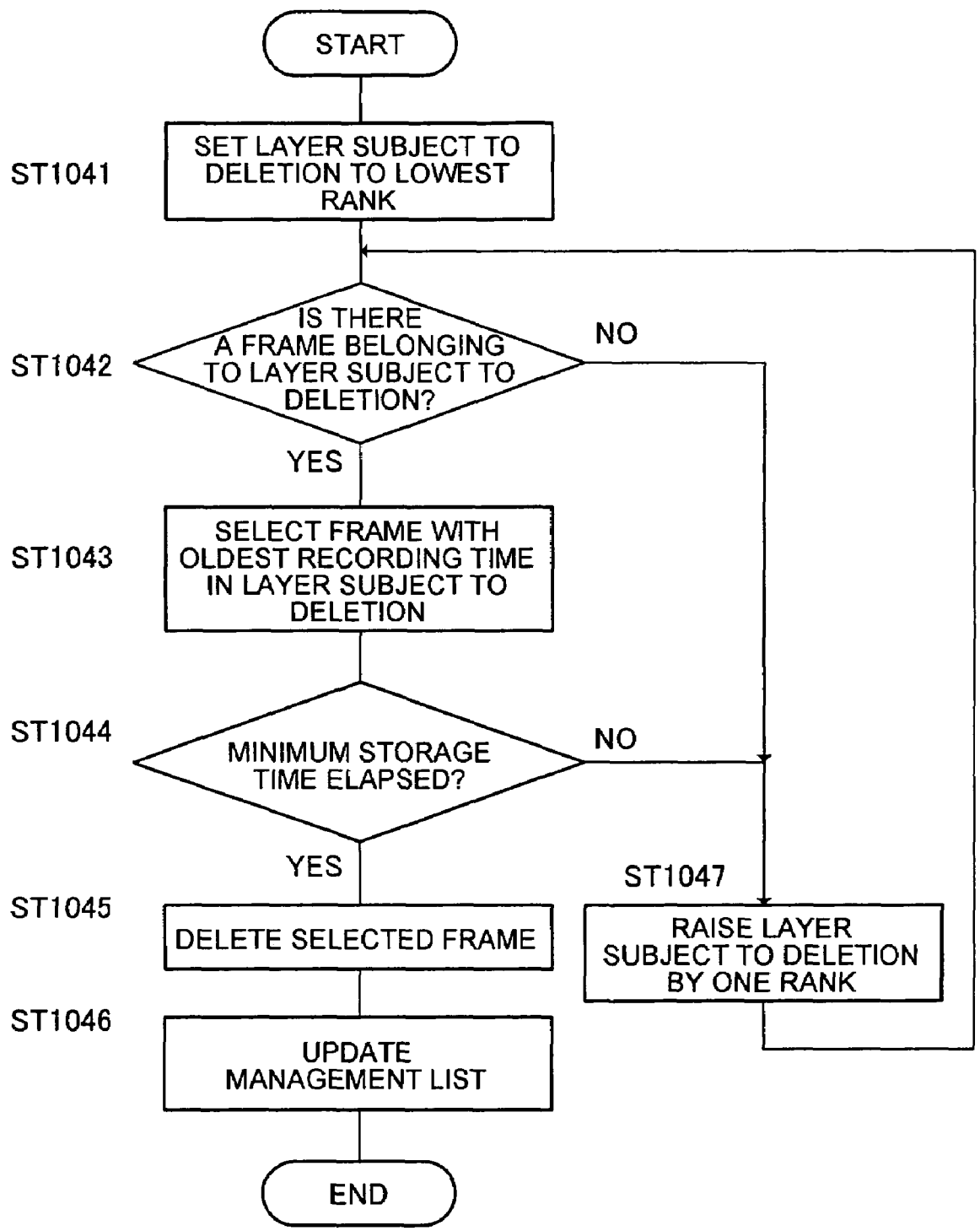
FIG. 6 is a flowchart showing the procedure of information amount reduction processing according to Embodiment 1 in greater detail.

Next, the procedure of above-mentioned ST1040 information amount reduction processing will be described in greater detail using the flowchart shown in FIG. 6.

Information amount reduction section 108 first sets the layer subject to deletion to the lowest rank (bottom layer) (ST1041). Then information amount reduction section 108 confirms whether frame data belongs to this layer subject to deletion (ST1042), and if belonging data exists, selects the frame data whose time of recording is oldest within this layer (ST1043), and confirms whether this data has passed the minimum storage time (ST1044). If the data has passed the minimum storage time, information amount reduction section 108 deletes the frame data selected in ST1043 (ST1045), and together with this, notifies management list update section 105 of the deleted frame data. Management list update section 105 updates data management list 104 accordingly (ST1046) If the selected frame data is determined not to have passed the minimum storage time in ST1044, the layer subject to deletion is raised to the layer one rank higher (ST1047).

The minimum storage time here denotes a period, set beforehand for each layer, within which frame data deletion is not performed.

An upper limit may be set for the layer rank increase in ST1047. That is to say, provision can be made so that a layer of a certain rank (level of importance) or higher is not deleted. As a result, data with the lowest frame rate is not deleted.

Figure 7:
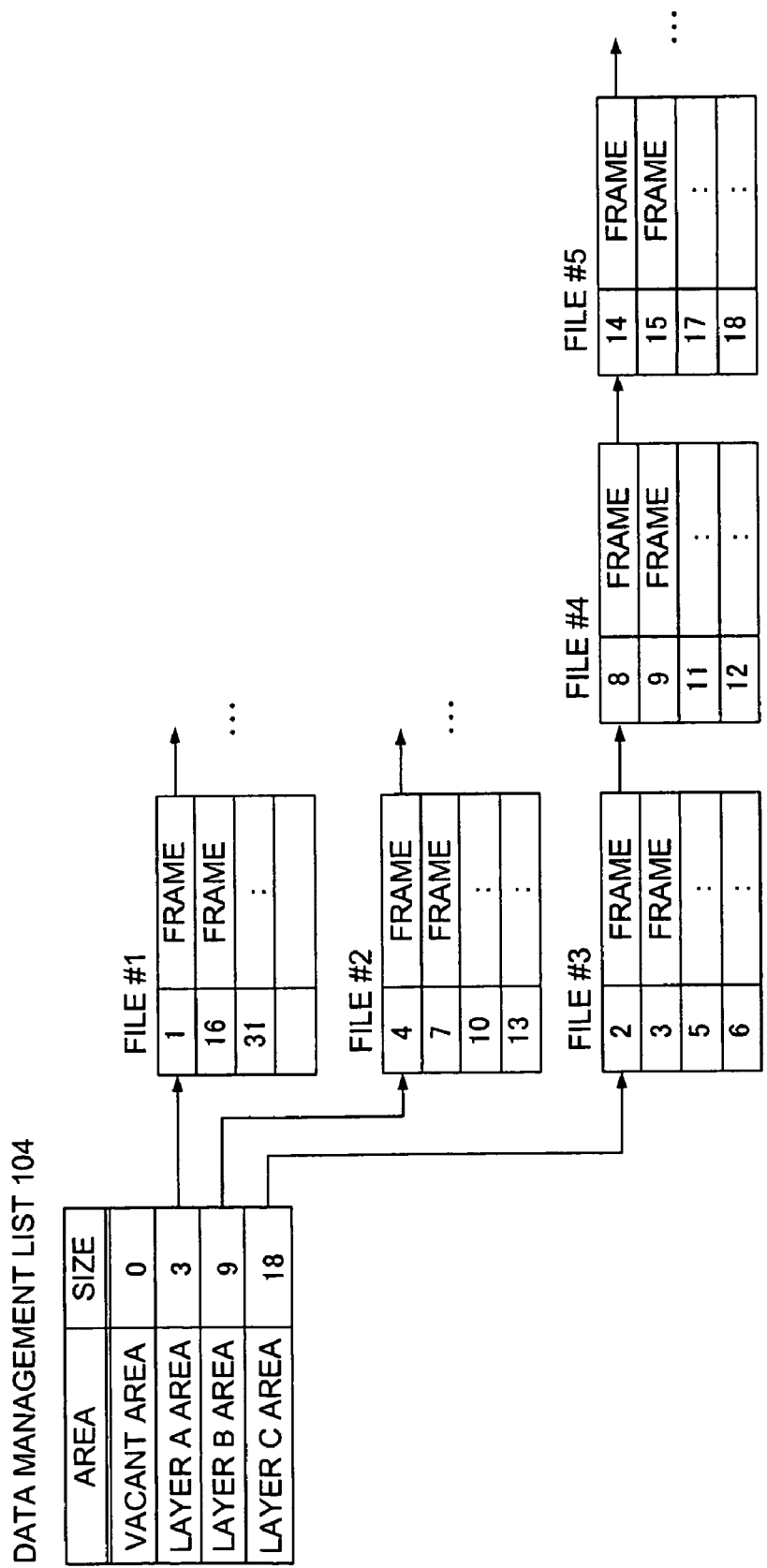
FIG. 7 is a drawing for explaining the relationship between a data management list and data files recorded in a data storage medium according to Embodiment 1.

FIG. 7 is a drawing for explaining the relationship between data management list 104 and data files recorded in data recording medium M1.

Files of a different area (files #1, #2, #3, ... ) corresponding to the respective layers are recorded in data recording medium M1, and the various frame data are held in the respective files. For example, frames 1, 16, 31, ... classified as layer A frames are recorded in file #1 corresponding to layer A.

At least filenames belonging to the respective layers are recorded in data management list 104 (indicated by arrows in the drawing). In the example shown in the drawing, information indicating the data size occupied by each layer is also recorded.

Figure 8:
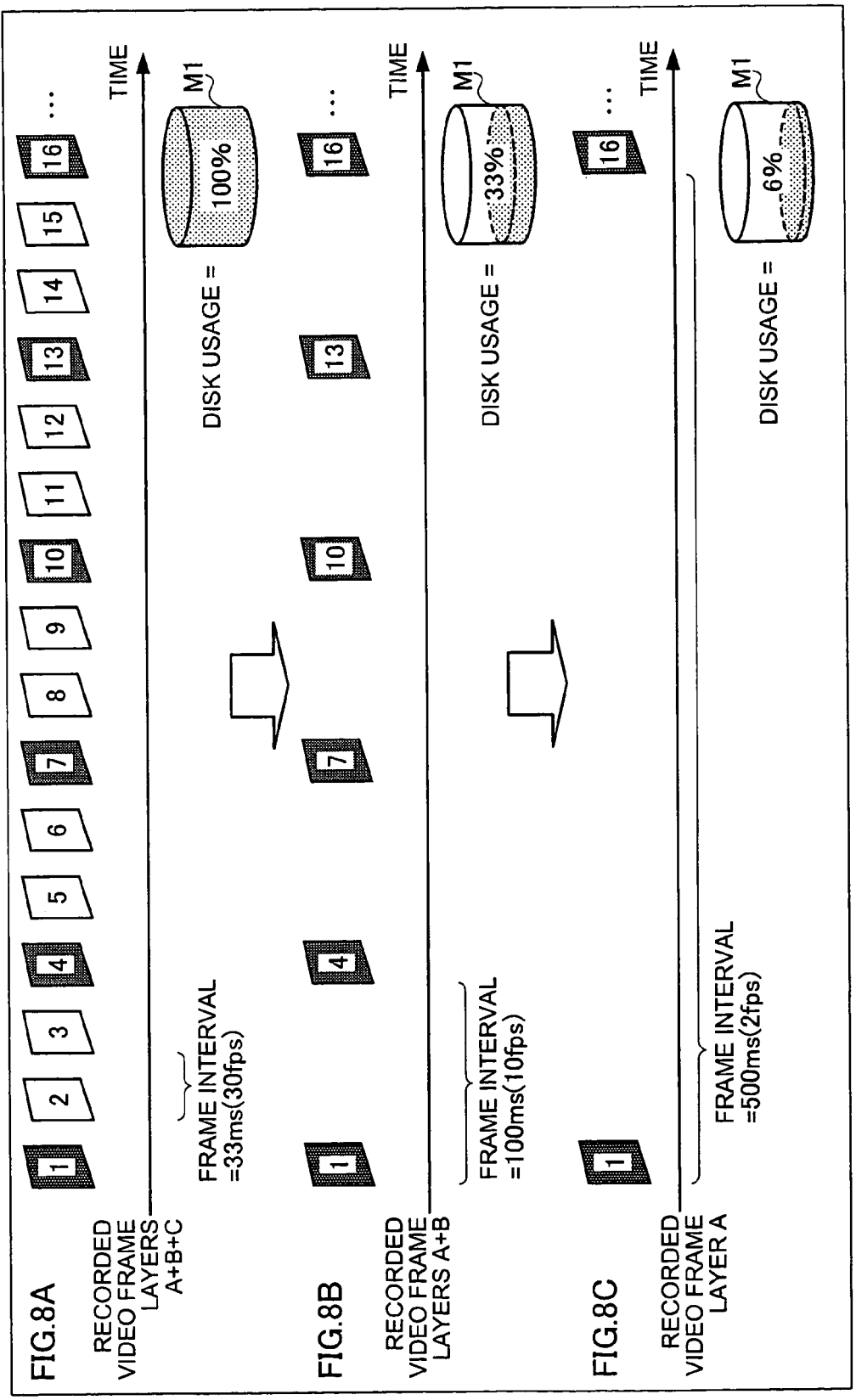
FIG. 8 is a drawing for explaining how the data configuration varies as a result of information amount reduction processing according to Embodiment 1.

FIG. 8A through FIG. 8C are drawings for explaining how the data configuration of data recording medium M1 varies as a result of the above-described information amount reduction processing.

Assume, for example, that settings have been made so that data is deleted in the order: layer C, layer B, layer A, and frame data is deleted starting with the frame data with the oldest time of recording. Assume also that a data minimum storage time has been set for each layer, and that a frame that has not passed this minimum storage time is not deleted.

First, before the above-described information amount reduction processing is executed, the data of all layers is arranged on the time axis as shown in FIG. 8A. At this time, usage of the recording medium M1 disk is 100%, and therefore information amount reduction processing is necessary. Thus, frames 2, 3, 5, 6, ... belonging to layer C become subject to deletion.

Next, when there are no more frames that can be deleted according to the above criterion in layer C and the vacant capacity of recording medium M1 has not yet reached or exceeded the threshold value as shown in FIG. 8B (for example, assuming a threshold value of 70%, when the vacant capacity of recording medium M1 is 67%, as shown in the drawing, and thus less than the threshold value), frames in layer B which is one rank higher are also deleted. When frames 4, 7, 10, and 13 belonging to layer B are deleted, the situation becomes as shown in FIG. 8C (in this example, the vacant capacity of recording medium M1 is 94%).

In a case where, for example, there are no more frames that can be deleted in layer B, and an upper limit has not been set for layer rank increases, layer A frames may also be deleted. When layer A frames are deleted, all the data recorded in that time frame will have been deleted.

Figure 9:
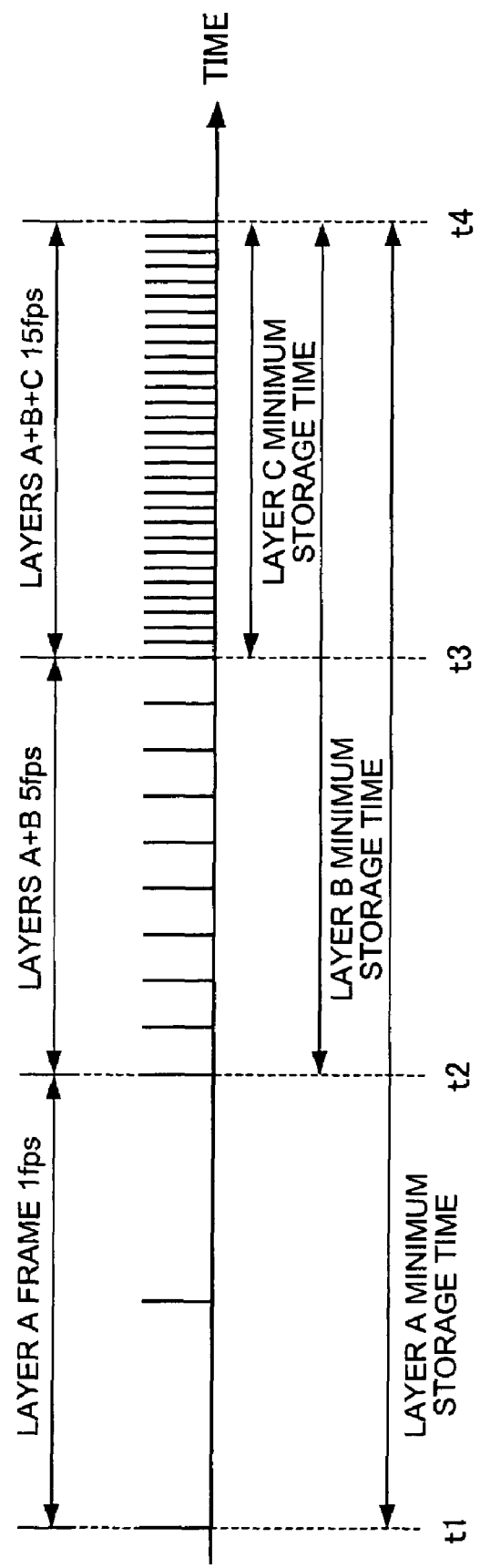
FIG. 9 is a drawing explaining how the data configuration varies on the time axis as a result of information amount reduction processing according to Embodiment 1.

FIG. 9 is a drawing explaining how the data configuration of recording medium M1 varies on the time axis as a result of the above-described information amount reduction processing.

As shown in this drawing, the period from time t4 back to time t3 is within the layer C minimum storage time, and therefore all the data of layers A through C remains during this period. Thus, the frame rate at this time is α (in the drawing, 15 fps). Also, the period from time t3 back to time t2 is within the layer B minimum storage time, and therefore the data of layers A and B remains during this period. Thus, the frame rate at this time is β (in the drawing, 5 fps). Furthermore, the period from time t2 back to time t1 is within the layer A minimum storage time, and therefore only the data of layer A remains during this period. Thus, the frame rate at this time is γ (in the drawing, 1 fps).

Thus, as time passes, the information amount (frame rate) of recorded data decreases stepwise, enabling the overall recorded data volume to be suppressed. On the other hand, new data is recorded in a recording medium in which spare capacity has arisen due to information amount reduction of old data, and can therefore be recorded for a long period.

Thus, according to this embodiment, surveillance data—which is large-volume frame data—is stored in recording medium M1 classified into hierarchical layers according to its data structure. That is to say, the minimum data necessary to form a frame is positioned as the most important data, and remaining data has its importance decided according to its relative frame rate, and is recorded classified into hierarchical layers. Then, when little vacant capacity remains in recording medium M1, deletion is performed in order starting with low-layer data—that is, data of low importance. Thus, large-volume data can be recorded for a long period according to its importance, by means of a simple configuration and simple processing, without imposing a heavy load on a surveillance system.

Also, with the above-described configuration, when deletion is performed in order starting with lower-layer data, deletion is performed in order starting with old data within one particular layer. Thus, looking at recorded data overall without awareness of layers, as time passes, a greater amount of information is deleted (the frame rate decreases more) the older the data is, while the amount of information of new data is maintained. That is to say, the degree of deletion of the amount of information varies according to the age of the data. This means that, while simultaneously considering the two criteria of "data importance" and "data age," data of low importance is made subject to deletion first. At this time, the overall amount of recorded data can be reduced while maintaining a high-precision state for new data that enables movement of the object of surveillance to be grasped in detail, enabling the most suitable image to be selected for recognizing a detailed part of the object of surveillance (such as the face of a person being shown, for example) from among these recorded data.

With the above-described configuration, also, by making a setting so that, in processing that deletes data in order starting with a lower layer, deletion is not performed for data that has not passed a minimum storage time set beforehand for each data, processing is made possible whereby the minimum data necessary for grasping an overview of the object of surveillance—that is, only the most important data considered from the standpoint of data structure—is left (a lower limit is set for the information amount, and this is maintained), even for comparatively old data. For new data, on the other hand, a high-precision state is maintained that enables movement of the object of surveillance to be grasped in detail, enabling the most suitable image to be selected for recognizing a detailed part of the object of surveillance (such as the face of a person being shown, for example) from among these recorded data.

In processing that deletes data in order starting with a lower layer, a setting may be made so that a layer of a certain rank (level of importance) or higher is not made subject to deletion (an upper limit is set for increasing the rank of the layer subject to deletion). By this means, processing is made possible whereby the minimum data necessary for grasping an overview of the object of surveillance—that is, only the most important data considered from the standpoint of data structure—is left (a lower limit is set for the information amount, and this is maintained), even for old data subject to deletion. Here, the aforementioned lower limit is set for the frame rate, resolution, or the like.

Even if recorded data is classified into hierarchical layers as described above, when data is deleted, the order of layers to be deleted may be changed flexibly according to circumstances rather than always having to delete in order starting with a lower layer. That is to say, layers may be treated as having a flat configuration rather than being treated as hierarchical. This enables recorded data to be thought of as simply being grouped focusing on their respective characteristics. By employing a configuration such that recorded data are stored classified into a plurality of layers while focusing on their respective characteristics in this way, in addition to processing whereby the information amount of recorded data is simply reduced progressively starting from data with the oldest time of recording as time passes, it is also possible to reduce the data information amount according to a new deletion criterion not tied to a time criterion. Thus, the deletion criterion can be amended ex post facto, and a new deletion criterion can also be added. That is to say, flexibility in reducing the data information amount can be improved. This point will be explained again in Embodiment 4.

Here, a case in which the frame rate is used as the criterion for determining the importance of data has been described by way of example, but when surveillance data is MPEG (Moving Picture Experts Group) type data, the MPEG picture type may also be used as a criterion.

To be specific, an I picture (data that enables a still image to be formed with this data only) is classified as layer A, a P picture (difference data between consecutive I pictures, forming a moving image by supplementing I picture data) as layer B, and a B picture (data for improving the quality of moving images) as layer C. This will be explained below in concrete terms using the accompanying drawings.

Figure 10:
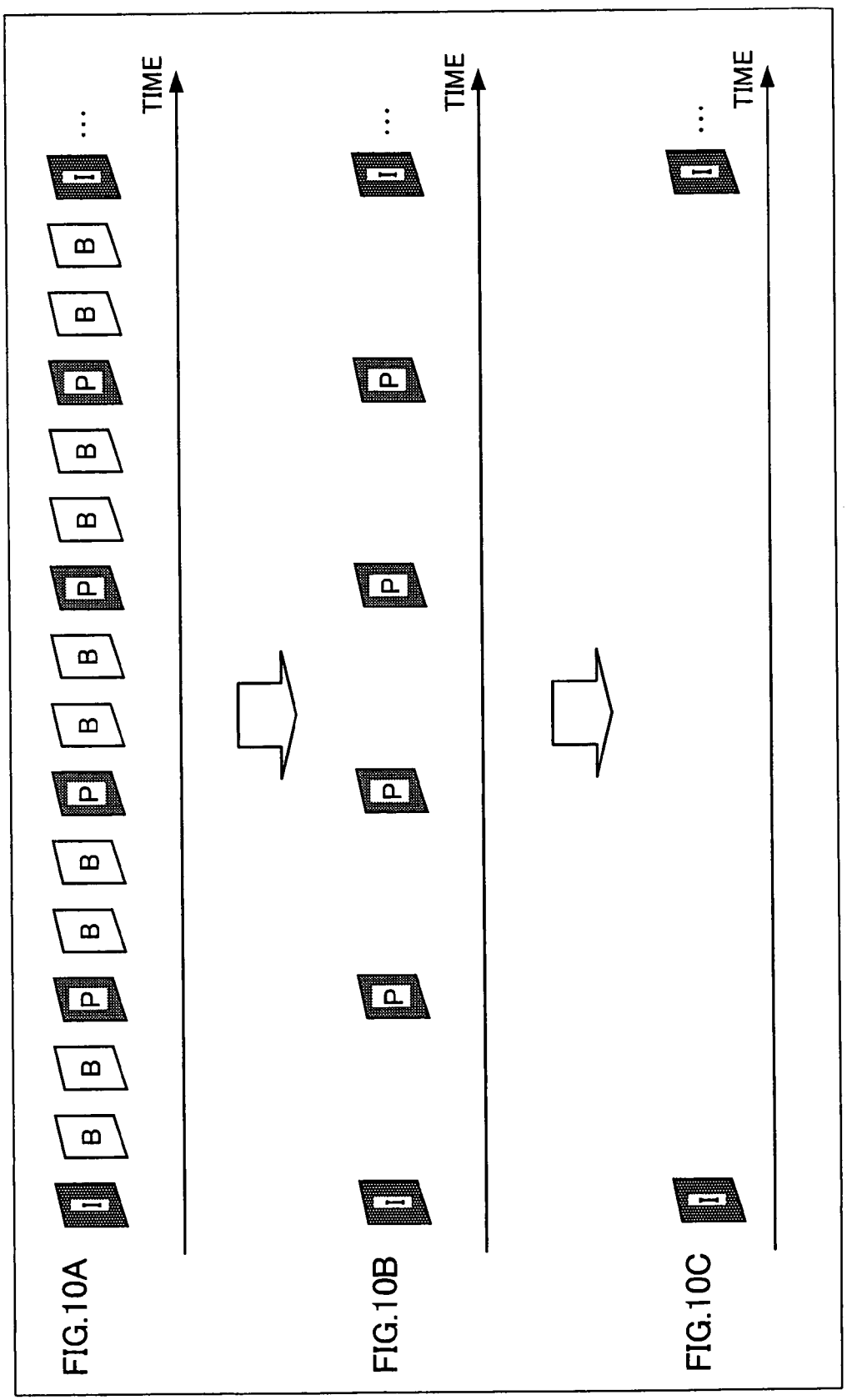
FIG. 10 is a drawing for explaining variations of recorded data when a multimedia data recording apparatus according to Embodiment 1 performs data amount reduction processing on MPEG data.

FIG. 10A through FIG. 10C are drawings for explaining variations of recorded data when multimedia data recording apparatus 100 performs data amount reduction processing on above-described MPEG data. This multimedia data recording apparatus has the same basic configuration as the multimedia data recording apparatus shown in FIG. 4, and therefore a description thereof is omitted here.

FIG. 10A is a drawing showing a case in which the recorded data is important. As shown in this drawing, when data amount reduction processing (thinning-out) has not been performed, all I picture, P picture, and B picture data belonging to layers A through C is present. In this case, all frames are stored as they are, and therefore when this data (that is, MPEG moving image data) is played back, movement is smooth and can be grasped in detail.

However, after layer C deletion has been performed (when only B frames have been thinned out), only I picture and P picture data remains, as shown in FIG. 10B. Thus, when this data is played back, it has a frame-advance appearance, and movement is jerky (the moving image quality has deteriorated), but can still be grasped to some extent.

After layer B deletion has also been performed (when P frames have been thinned out), only I picture data remains, as shown in FIG. 10C. Thus, at this stage, this recorded data cannot form a moving image, and is in the form of a plurality of recorded still images, being equivalent to JPEG image data.

The recorded video data format is also made to conform to coding that performs compression between frames such as MPEG2/MPEG4 and so forth. Therefore, new video or important video is stored as moving-image video. This enables the features of MPEG2/MPEG4 to be exploited.

Unimportant video is changed to a still image storage format. As a result, the video appears to be stored as a JPEG image, as a still image (thumbnail) representing the situation in a particular time frame.

Thus, even if MPEG picture type is used as a criterion when determining the importance of data, the same kind of effect can be obtained as when the frame rate is used as a criterion.

Furthermore, an enhancement layer utilized in MPEG scalable coding may also be used as a criterion when determining the importance of data.

An MPEG scalable coding method is a hierarchical coding method that, in line with the diversification of networks in recent years, enables video to be transmitted at quality appropriate to a plurality of bands by having a hierarchical structure. MPEG scalable coding methods include MPEG4 FGS (Fine Granularity Scalability), MPEG4 simple scalable profile, Wavelet based coding, and so forth, but in the following description MPEG4 FGS will be considered as an example.

Video data coded by means of FGS is composed of a base layer, which is a moving image stream for which stand-alone decoding is possible, and at least one or more enhancement layers, which are moving image streams for improving the base layer coded moving image quality. The base layer is low-band, low-quality video data, and highly flexible implementation of high image quality can be achieved by supplementing this with enhancement layers according to the band. This will be explained below in concrete terms using the accompanying drawings.

Figure 11:
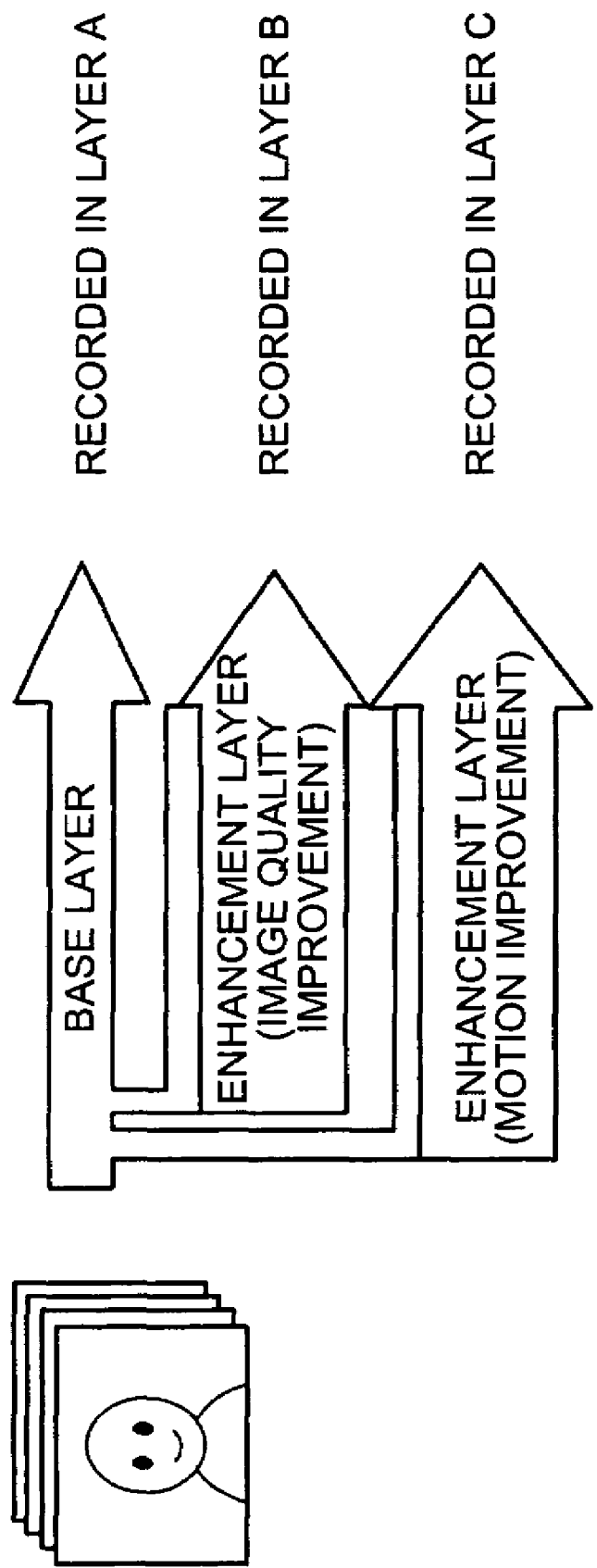
FIG. 11 is a drawing for explaining an overview of data recording processing when MPEG4 FGS is used as an importance criterion.

FIG. 11 is a drawing for explaining an overview of data recording processing when MPEG4 FGS is used as an importance criterion.

Here, we will assume a situation in which it is sufficient to be able to grasp only movement of the object of surveillance, or a situation in which only a detailed image of the object of surveillance is necessary. An example would be surveillance of entry into a security zone. In a case of this kind, a low frame rate (low definition) is acceptable for recorded data when there is nobody in the monitored area. On the other hand, if an intruder attempts entry, it is only necessary to have several high-definition images (especially images of the intruder's face).

Here, therefore, as shown in FIG. 11, the FGS base layer is mapped onto layer A and the FGS enhancement layers are mapped onto layer B and layer C respectively. By this means, it is possible to change not only the frame rate but also the resolution (image quality) of important data. For other data, on the other hand, the frame rate is kept high enough to enable human movements to be grasped even if the resolution is low. Also, if an abnormality occurs, such as attempted entry that does not follow the prescribed procedure, for example, data is saved just as it was when recorded (written) (that is, at a high frame rate and high resolution).

FIG. 12A through FIG. 12D are drawings for explaining differences in image quality when FGS data divided into layers as described above is played back. FIG. 12D shows data at the time of recording—that is, the image quality when data with layers A through C all fully included is played back; FIG. 12A shows the image quality when the FGS enhancement layers (layers B and C in terms of the layer divisions of the present invention) have been deleted and only the FGS base layer (layer A) remains; FIG. 12B shows the image quality when the FGS "motion improving" enhancement layer (layer C) has been deleted and layer A and layer B remain; and FIG. 12C shows the image quality when the FGS "image quality improving" enhancement layer (layer B) has been deleted and layer A and layer C remain.

In FIG. 12B, since the FGS "motion improving" enhancement layer has been deleted, the played-back image is a moving image with motion, but with poor precision and a frame-advance appearance. On the other hand, in FIG. 12C, since the FGS "image quality improving" enhancement layer has been deleted, motion is smooth but image quality is poor, and the outline of the person's face is jagged. In FIG. 12A, since both the FGS "motion improving" enhancement layer and the FGS "image quality improving" enhancement layer have been deleted, the video has a frame-advance appearance and poor image quality.

Thus, even if enhancement layers used in MPEG scalable coding are used as a criterion when determining the importance of data, the same kind of effect can be obtained as when the frame rate is used as a criterion.

Embodiment 2

One method of setting a criterion for determining the importance of data is to focus on the data structure and consider data important to the extent that it is minimal necessary data for showing certain information (such as I picture data in the case of MPEG, for example), as illustrated in Embodiment 1. However, the importance of the content itself of information indicated by data can also be used as a data importance criterion. For example, data recorded before and after the occurrence of an event, or data with a large amount of image variation (=vigorous movement) between frames, can be said to be important data.

In this embodiment, an object of surveillance is supposed for which there is normally no movement, or for which, if there is movement, scenes in which there is movement and there is no movement can be clearly distinguished. For example, in the case of surveillance of an outdoor installation or surveillance of a building at night, monitoring access to a specific room or the like conforms to this scenario.

A characteristic of these surveillance data is that there are a number of successive image frames that can virtually be classed together within recorded data. These data cannot be called important data since however many are stored the storage area cannot be said to be used effectively. Therefore, in this embodiment, layers are decided according to the amount of image variation (the degree of vigor of movement of the object of surveillance). For example, if the difference in brightness compared with the previous frame is great (image variation is great) data is classified as layer A data, and if the difference in brightness compared with the previous frame is small (image variation is small) data is classified as layer C data. Then reduction of the data amount by means of frame thinning-out or the like is performed on layer C, etc. On the other hand, for old recorded data, frames with a small amount of image variation between frames are thinned out. This will be explained below in concrete terms using the accompanying drawings.

Figure 13:
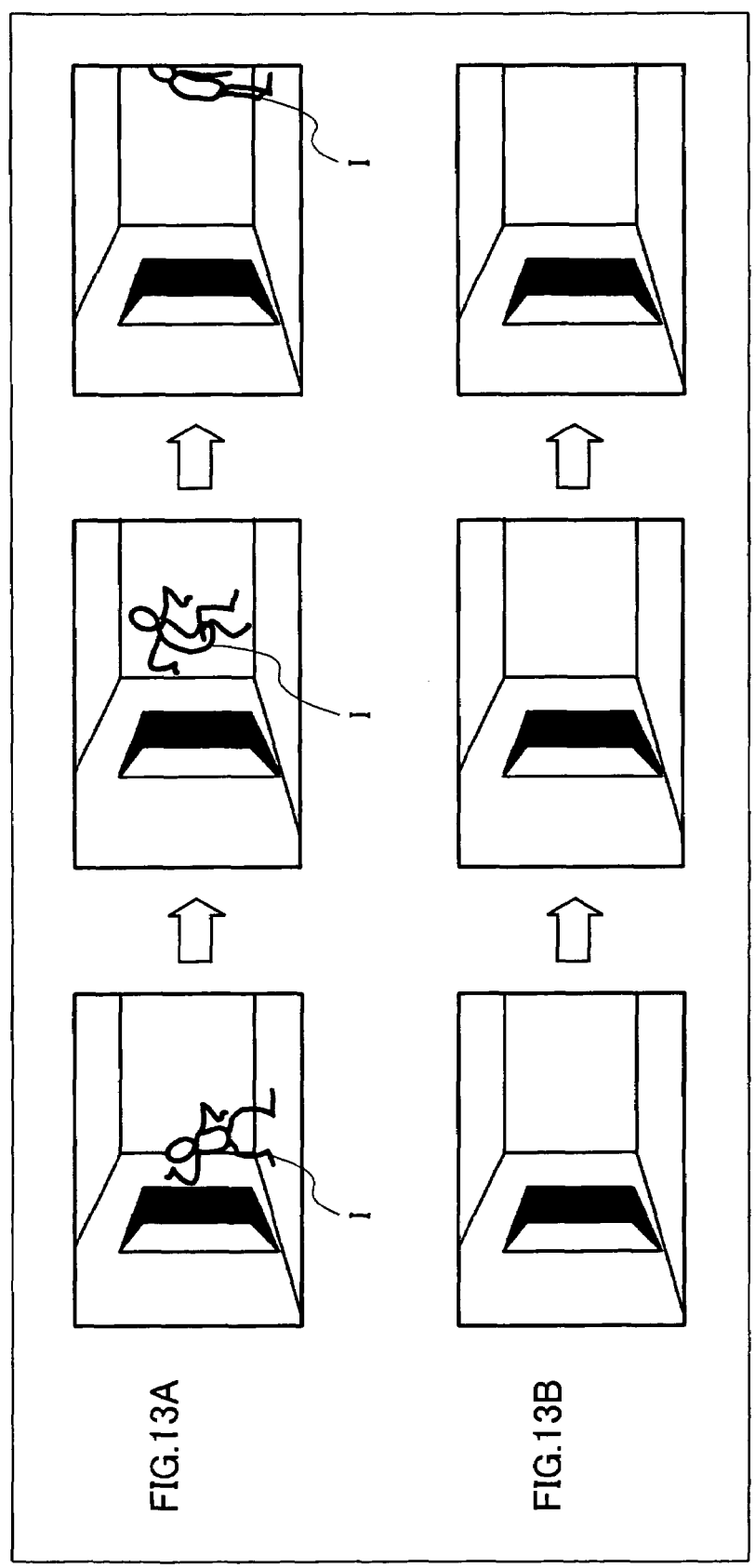
FIG. 13 is a drawing showing concrete examples of data recording processing according to Embodiment 2.

FIG. 13A and FIG. 13B are drawings showing concrete examples of the above-described data recording processing.

Figure 14:
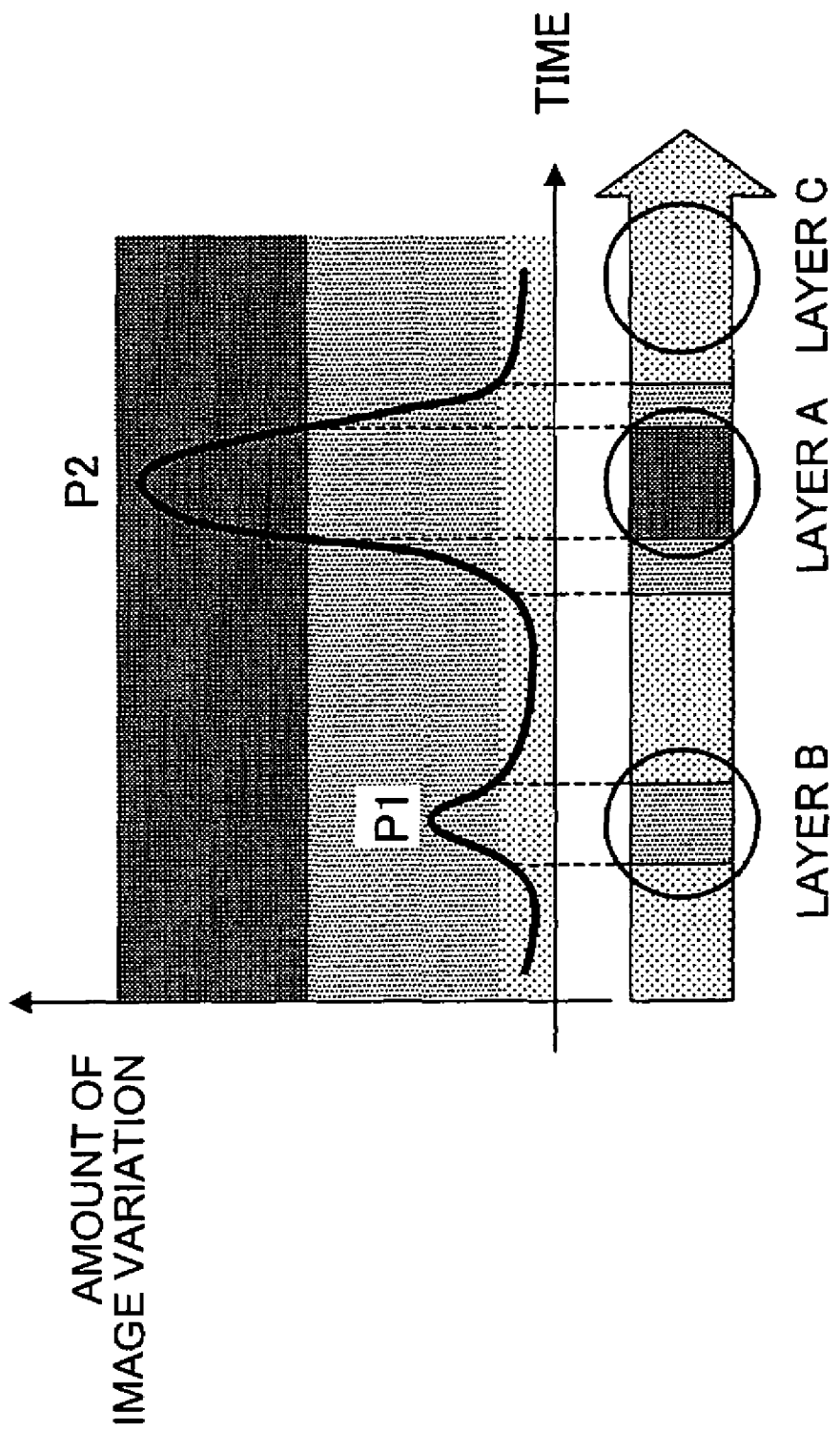
FIG. 14 is a graph of the amount of image variation.

When a surveillance camera is not showing anything, as shown in FIG. 13B, there is little value in storing recorded data for a long period. However, when the surveillance camera shows an intruder I, it is highly necessary to store this recorded data. To consider the amounts of image variation of these data using FIG. 14, in the image variation amount graph in FIG. 14 the kind of recorded data shown in FIG. 13A is data P2 showing the highest peak. Thus, as shown in FIG. 14, this data is classified as layer A data, data P1 with a lower peak than data P2 is classified as layer B data, and remaining data not showing a peak is classified as layer C data.

Thus, according to this embodiment, surveillance data—which is large-volume frame data—is stored in recording medium M1 classified into hierarchical layers according to the amount of image variation between frames. That is to say, recording is performed in accordance with the importance of the content indicated by the data. Then, when little vacant capacity remains in recording medium M1, deletion is performed starting with data of low importance. Thus, large-volume data can be recorded for a long period according to its importance, by means of a simple configuration and simple processing, without imposing a heavy load on a surveillance system.

When data recorded after the occurrence of an event is considered to be important data, it is possible, for example, for data recorded after the occurrence of an event of high importance in terms of event content to be classified as layer A data, for data of an event of low importance as an event in comparison with data classified as layer A data to be classified as layer B data, and for data not related to an event but recorded periodically in accordance with scheduling to be classified as layer C data.

Embodiment 3

In this embodiment, the data structure of data management list 104 is made a further subdivided hierarchical structure. That is to say, a "segment" layer is further provided above the layers described in Embodiment 1 and Embodiment 2, and recorded data is recorded within this further subdivided structure.

Figure 15:
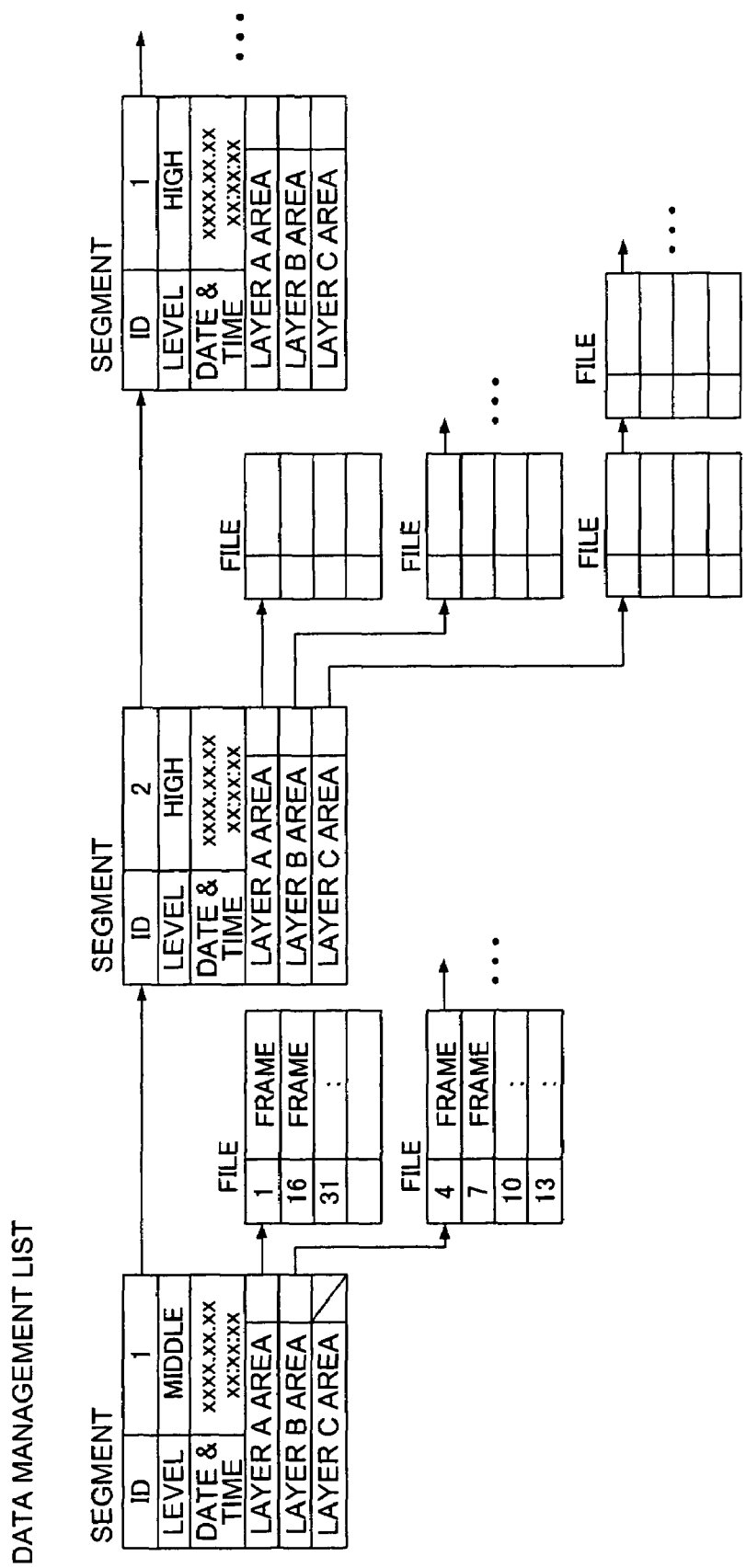
FIG. 15 is a drawing showing the data structure of a data management list according to Embodiment 3.

FIG. 15 is a drawing showing the data structure of data management list 104.

In this embodiment, a group of frames recorded in a fixed period is taken as data of one segment, and a level indicating data importance is set on a segment-by-segment basis. The (rank of the) layer stored is decided according to this level. That is to say, when recording, layers are assigned according to importance in segment units, and in data amount reduction, layers of a certain fixed rank or higher are kept, and layers of ranks lower than this level are deleted.

As the criterion for determining the importance of data, the importance of the content itself of the information indicated by the data is used, in the same way as in Embodiment 2. To be specific, a level is decided according to the importance of the factor (event, schedule, user instruction, etc.) responsible for recording the data. For example, a case where a sensor detects an abnormality and issues an alarm is considered to be an important event. That is to say, in a third-party intrusion prevention system, data collected "when a human-body sensor reacts" or "when a person perceives an abnormality and sounds an alarm bell" is important, and is therefore treated as of the highest importance. On the other hand, "no level" is set for data unrelated to an event (such as data recorded periodically in accordance with scheduling, for example).

When information amount reduction section 108 deletes a "no level" segment, it deletes all the layers within that segment. On the other hand, if a layer of a level lower than the level of the segment subject to deletion is held in this segment, only frames belonging to this layer are deleted. If the segment level and stored layer level are the same, the segment subject to deletion is switched to the next segment.

Figure 16:
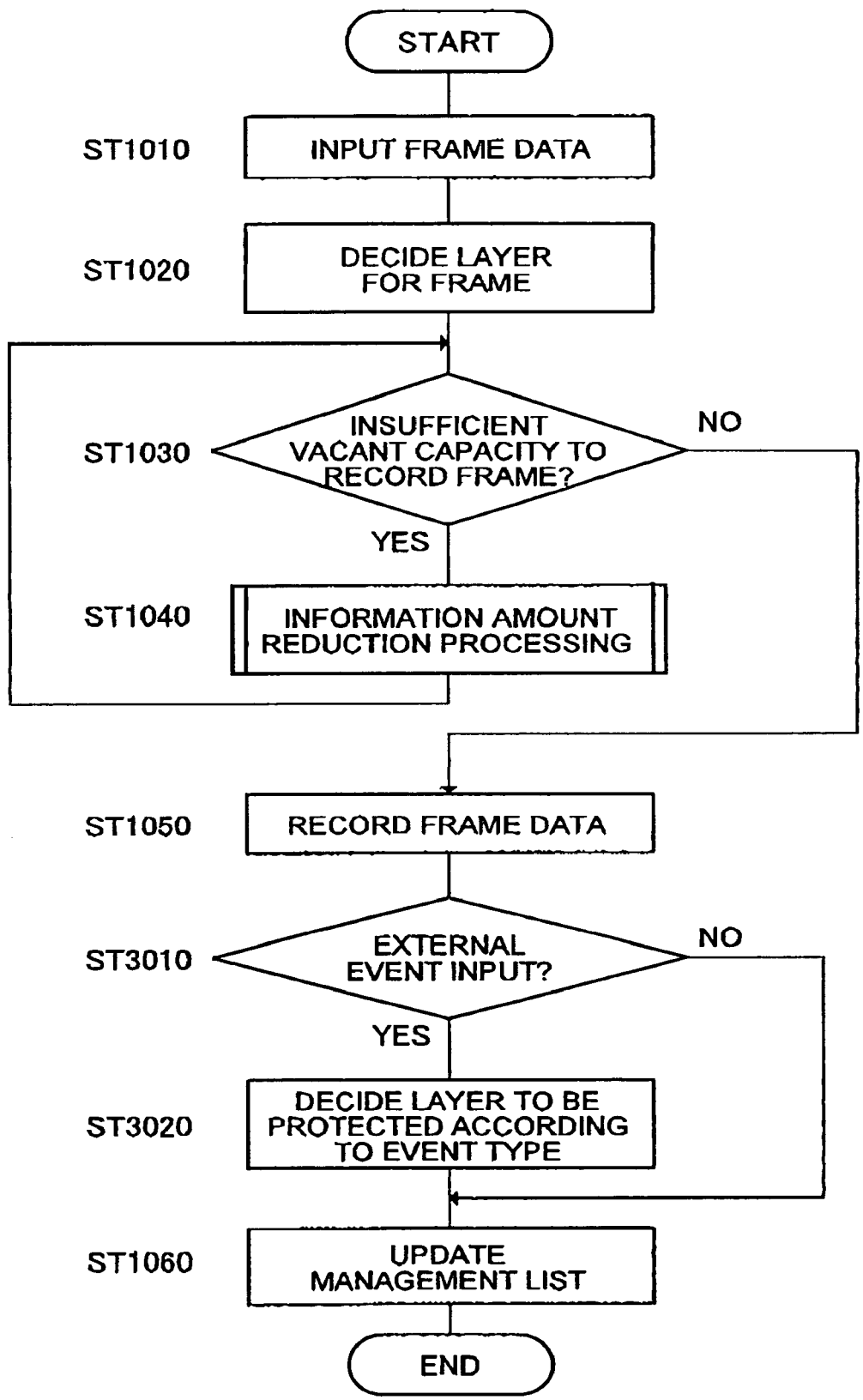
FIG. 16 is a flowchart showing the data recording processing procedure according to Embodiment 3.

FIG. 16 is a flowchart showing the data recording processing procedure according to this embodiment. This flowchart is identical to the flowchart shown in FIG. 5 up to ST1050, and therefore a description of this part of the flowchart is omitted here.

After frame data is recorded in ST1050, it is determined whether the occurrence of an event has been reported by means of an alarm from an external sensor or the like (whether there is event input) (ST3010). Then, if an event has occurred, the layer in which the frame data is to be protected is decided according to the type of event (ST3020).

For example, if the water level of dam D1 has merely exceeded the average level, a comparatively low layer is assigned to the data in which this fact is recorded, but if a maximum-level accident has occurred, such as when the water level of dam D1 has exceeded a warning level or the wall of dam D1 has burst, the highest layer is assigned to that frame data.

After the layer has been decided according to the type of event in ST3020, or if it is determined in ST3010 that there is no external event input, the management list updating described earlier is performed (ST1060).

Figure 17:
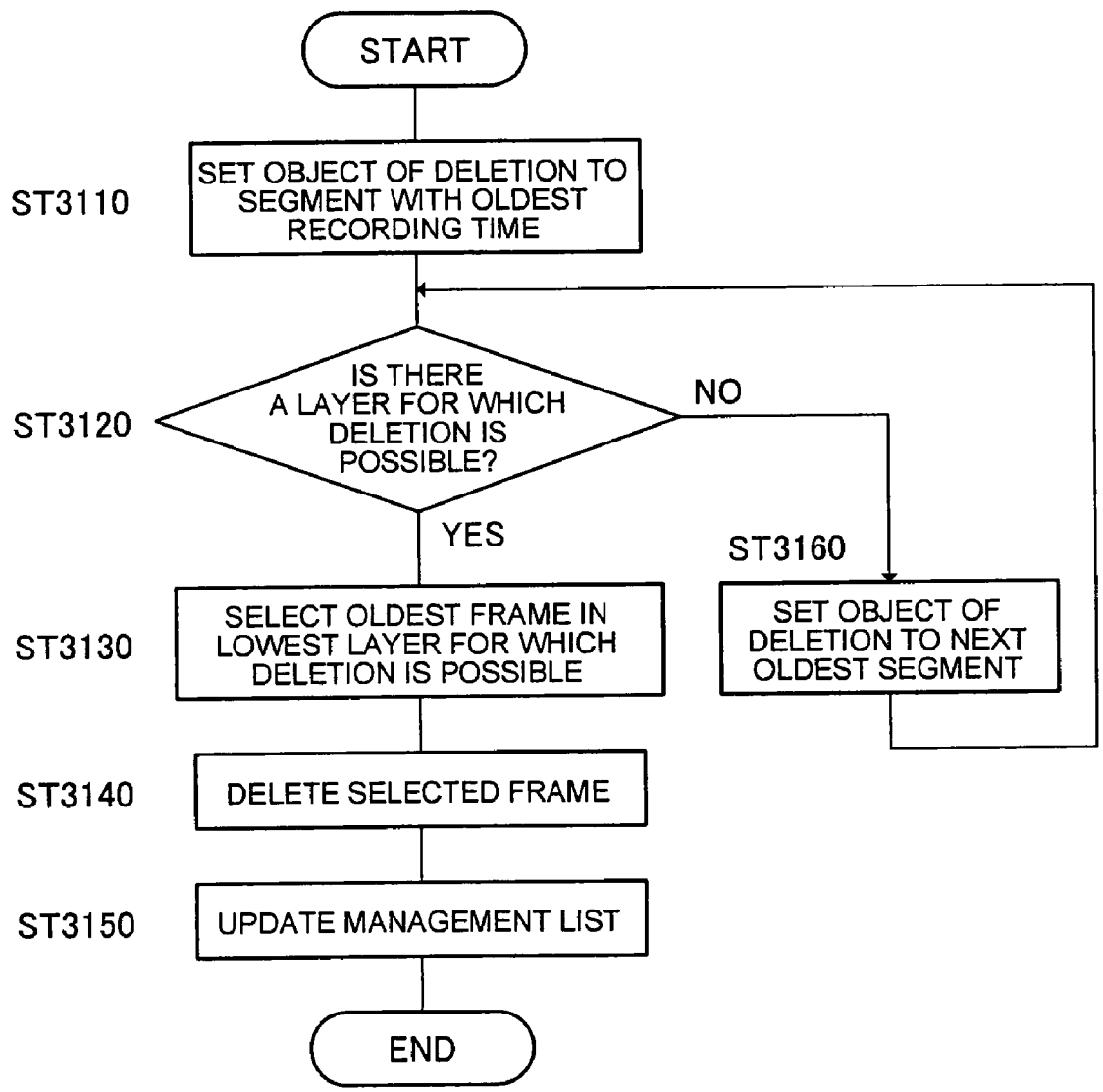
FIG. 17 is a flowchart showing the procedure of information amount reduction processing according to Embodiment 3 in greater detail.

FIG. 17 is a flowchart showing the procedure of information amount reduction processing (ST1040) according to this embodiment in greater detail.

Information amount reduction section 108 first sets the data subject to deletion to the segment with the oldest time of recording (ST3110). Then information amount reduction section 108 confirms whether a layer for which deletion is possible is present in this segment (ST3120), and if an applicable layer is present, selects the frame data with the oldest recording time within this layer (ST3130), and deletes this frame data (ST3140). Information amount reduction section 108 also notifies management list update section 105 of this deleted frame data. Management list update section 105 updates data management list 104 in accordance with this notification (ST3150). If it is determined in ST3120 that there is no layer for which deletion is possible, the segment subject to deletion is set to the next oldest segment (ST3160), and the processing flow returns to ST3120.

A case has been described here, as an example, in which a segment is set according to the age of the time of recording, but this embodiment is not limited to this case, and data may also be divided into segments based on the importance of the data (where this is a different criterion from the criterion for layer division).

Thus, according to this embodiment, recorded data is recorded in a further subdivided hierarchical structure composed of segments and layers, enabling data to be erased based on a plurality of deletion criteria, and a more flexible data recording method to be provided. Also, by this means, the degree of information amount (data amount) deletion can be varied according to the importance of data. Generally, even in the case of so-called important data, the precision of data considered as important comes to differ in the future according to the properties of the data. For example, even if data is classified as important data because it is related to an event, the required data precision varies according to the degree to which a user wants information related to the content of that event. That is to say, the fact that data is important data does not necessarily mean that all the data is considered necessary. On the other hand, even if data is classified as important data, when the properties of surveillance data are considered, rather than deleting all recorded data because it has become old, it is desirable to store part of the data at fixed intervals since it does not matter if the data is of low resolution or low precision. Therefore, in this embodiment, a versatile data recording method is provided in consideration of the above.

Also, with the above-described configuration, a segment subject to deletion is first selected based on the age of the time of recording, and then a layer in which data of low importance conforming to the deletion conditions is stored within that segment is deleted. Thus, looking at recorded data overall without awareness of layers, as time passes, a greater amount of information is deleted the older the data is, while the amount of information of new data is maintained. That is to say, the degree of deletion of the amount of information varies according to the age of the data. This means that, while simultaneously considering the two criteria of "data importance" and "data age," old data is made subject to deletion first. At this time, the overall amount of recorded data can be reduced while maintaining a high-precision state for new data that enables movement of the object of surveillance to be grasped in detail, enabling the most suitable image to be selected for recognizing a detailed part of the object of surveillance (such as the face of a person being shown, for example) from among these recorded data.

Embodiment 4

In this embodiment, the layer of data recorded before and after the occurrence of an event (event data and pre-event data) can be changed ex post facto. This is because, in a surveillance system installed at an intersection, for example, a recording prior to the occurrence of a traffic accident is more important than a recording after the occurrence of the accident for the purpose of analyzing the cause of the accident. This will be explained below in concrete terms using the accompanying drawings.

Figure 18:
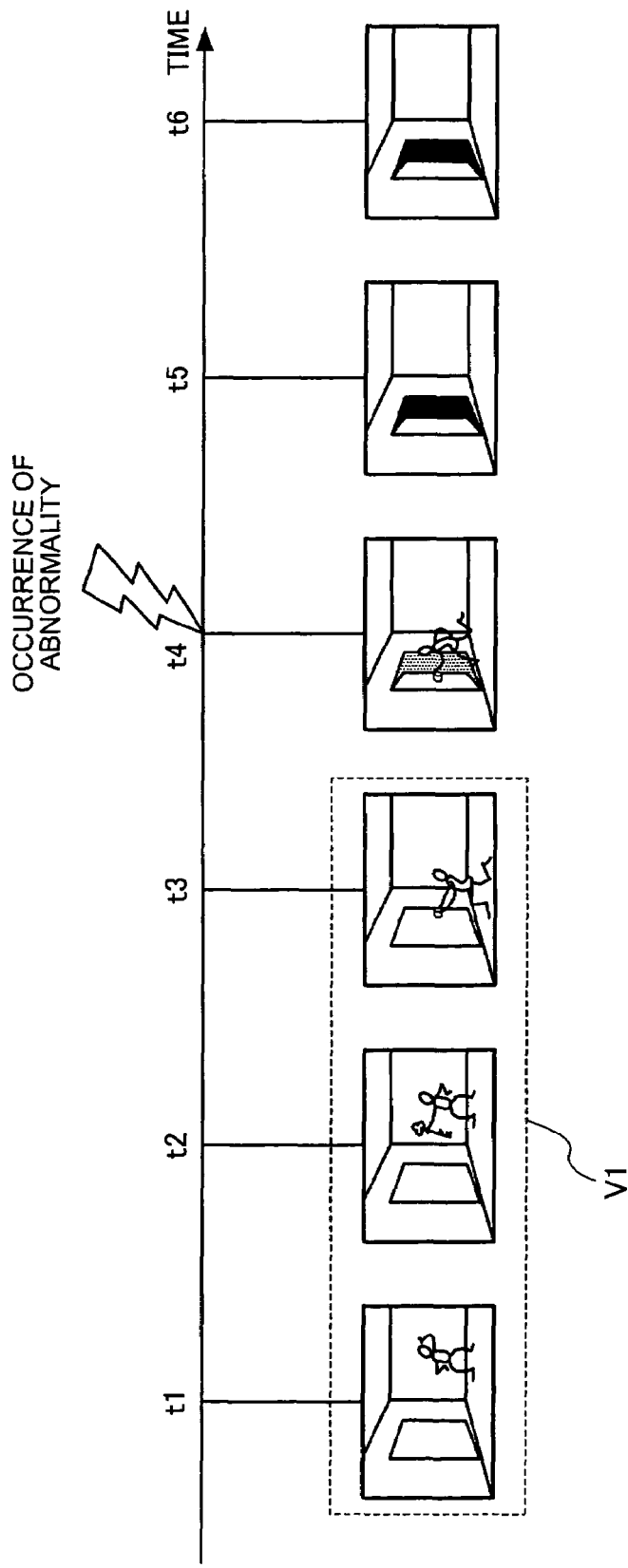
FIG. 18 is a drawing showing an overview of data recording according to Embodiment 4.

FIG. 18 is a drawing showing an overview of data recording according to this embodiment.

In this surveillance system, at time t4 during surveillance a sensor detects the occurrence of an abnormal state (event) subject to an alarm, and issues an alarm to the user, etc., based on this. Meanwhile, a multimedia data recording apparatus according to this embodiment performs video recording linked to this alarm issuance.

Video captured from the occurrence of the event onward (event data) is important data, but video (pre-event data) V1 captured at time t1 through time t3 prior to the occurrence of the event is also important data. Therefore, this pre-event data (long-duration data spanning several seconds to several tens of minutes) is also recorded.

When an event occurs, the rank of the layer of data to be recorded henceforth is raised above that for normal recording. Also, since pre-event data is also important and requires the same high-definition image quality and high frame rate as event data, when an event occurs, a change is also implemented that raises the layer rank (importance level) of already recorded data ex post facto. That is to say, going back to a predetermined time in the past from the time of the event occurrence, a change is implemented that raises the rank of the layer in which data recorded from that point in time is classified. At this time, only the layer rank is changed, and data movement (a change of the data recording location in memory) is not performed.

The layer rank may also be decided taking the type of event (the importance of the event itself) into consideration, in the same way as shown in Embodiment 3.

Figure 19:
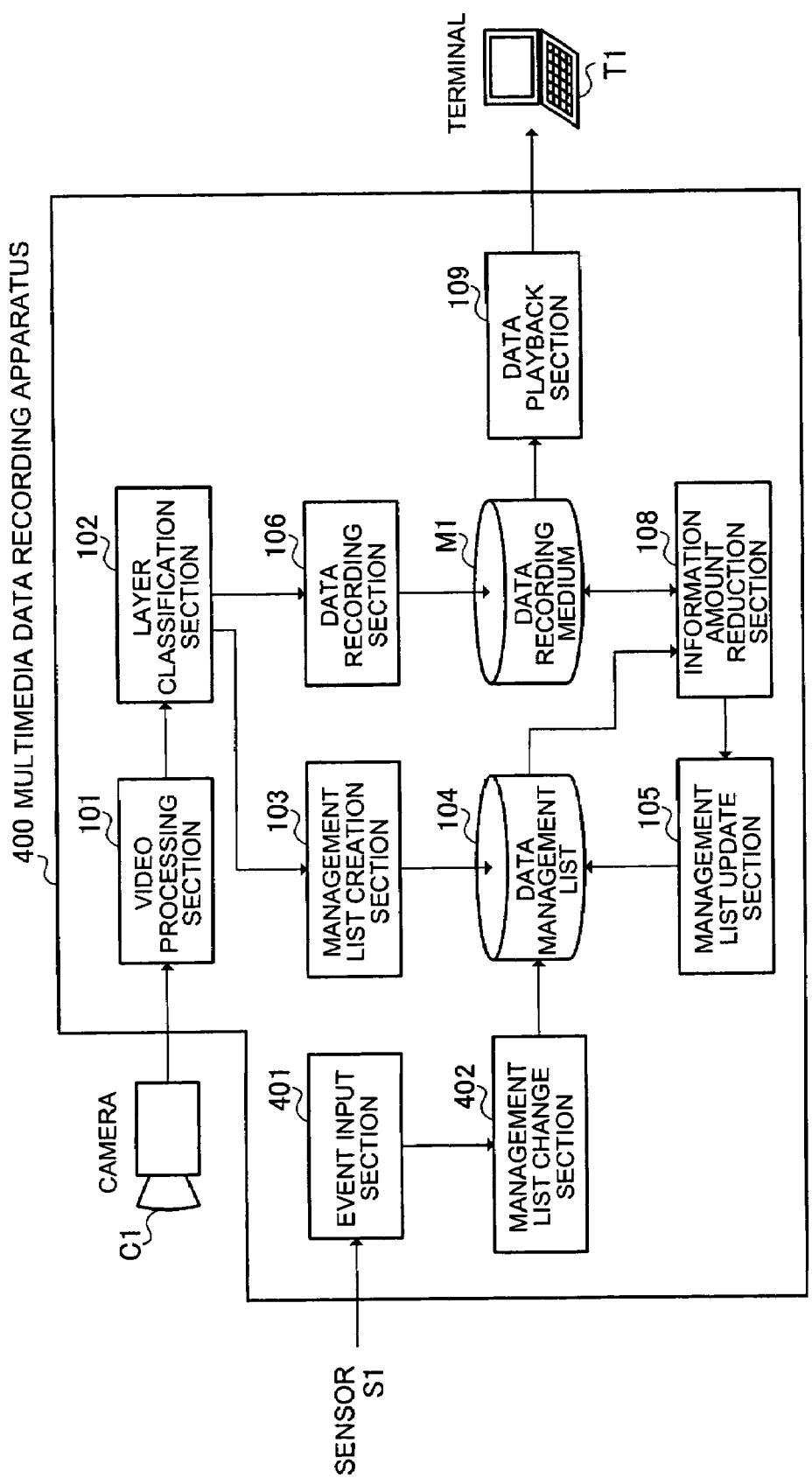
FIG. 19 is a block diagram showing the main configuration of a multimedia data recording apparatus according to Embodiment 4.

FIG. 19 is a block diagram showing the main configuration of a multimedia data recording apparatus 400 according to this embodiment that makes the above-described operation possible. This multimedia data recording apparatus 400 has a similar basic configuration to multimedia data recording apparatus 100 shown in Embodiment 1 (see FIG. 4), and therefore identical configuration elements are assigned the same codes as in FIG. 4 and descriptions thereof are omitted.

Multimedia data recording apparatus 400 has an event input section 401 and a management list change section 402. On receiving an alarm notification from an external sensor S1, event input section 401 reports this to management list change section 402, and changes the contents of data management list 104.

Figure 20:
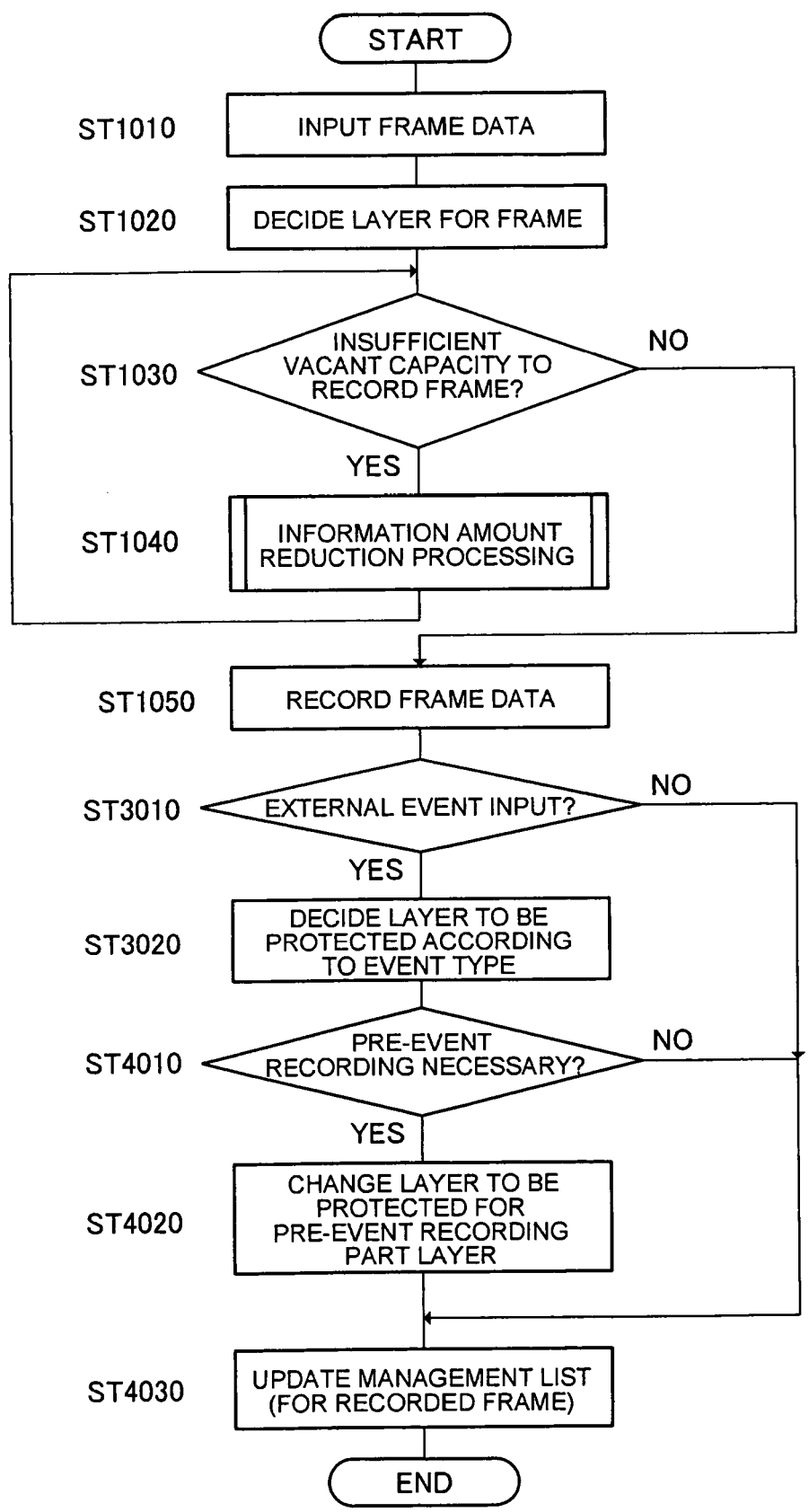
FIG. 20 is a flowchart showing the multimedia data recording processing procedure according to Embodiment 4.

The procedure of the above-described multimedia data recording processing will now be described using the flowchart shown in FIG. 20. The procedure of this flowchart is basically similar to that of the flowchart shown in FIG. 16, and therefore identical steps are assigned the same codes and a description of these steps is omitted here.

After a layer has been decided according to the type of event in ST3020, it is determined whether pre-event recording is necessary (ST4010). Specifically, it is determined whether or not an alarm has been reported to event input section 401 from external sensor S1. Then, if pre-event recording is necessary, going back to a predetermined time in the past from the time of the event occurrence, a change is implemented that raises the rank of the layer in which data recorded from that point in time is protected (classified) (ST4020). The final saved data information amount is decided according to this layer rank. Then management list change section 402 updates the contents recorded in data management list 104 in accordance with the above-described layer change (ST4030) If it is determined in ST3010 that there is no external event input, above-described processing steps ST3020, ST4010, and ST4020 are not performed.

Figure 21:
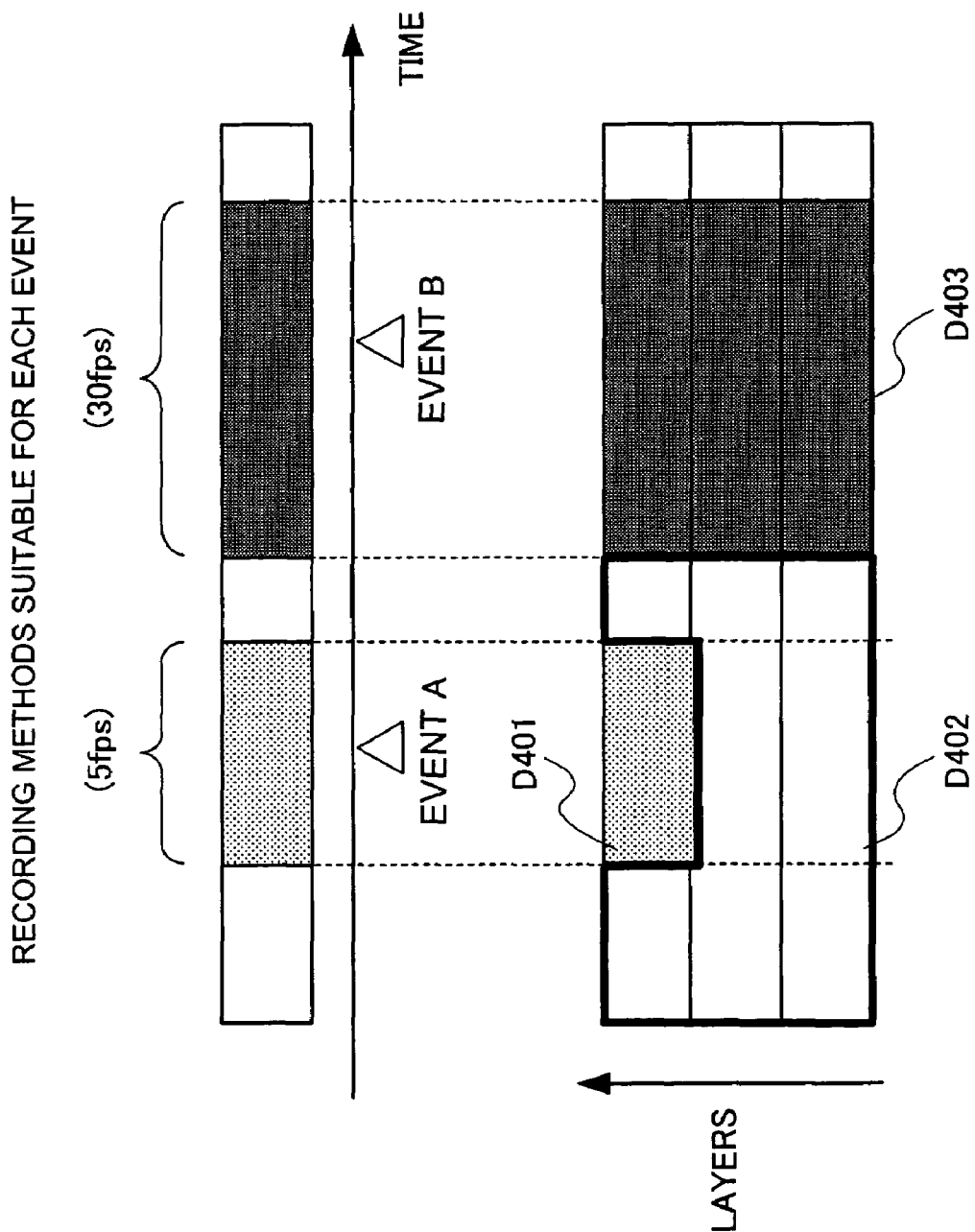
FIG. 21 is a drawing explaining the data structure in accordance with a multimedia data recording method according to Embodiment 4.

FIG. 21 is a drawing explaining the data structure in accordance with a multimedia data recording method according to this embodiment.

A multimedia data recording apparatus according to this embodiment decides the layer to be protected and the data update range at the point in time at which the respective event is input. In the example in this drawing, event A and event B are input, data D401 is data belonging to a layer to be protected for event A (event data and pre-event data), data D403 is data belonging to a layer to be protected for event B (event data and pre-event data), and data D402 is determined to be data for which deletion is possible in the future. Therefore, data D402 is deleted immediately when the vacant capacity of memory M1 falls to or below a predetermined value (when capacity is exceeded) or after the elapse of a predetermined time. This data D402 is stored all together (in consecutive memory addresses) to facilitate deletion.

Figure 22:
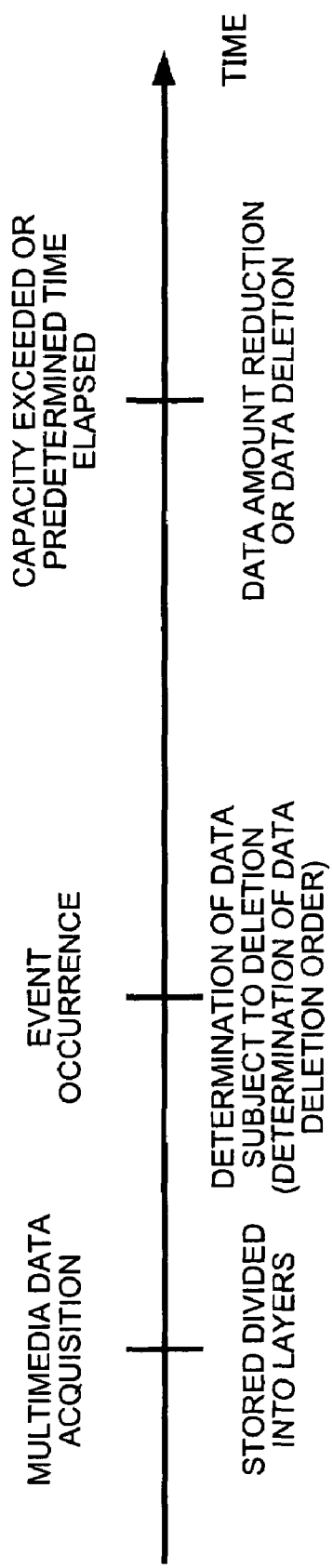
FIG. 22 is a drawing showing a time-sequence representation of the procedure of a multimedia data recording method according to Embodiment 5.

FIG. 22 is a drawing showing a time-sequence representation of the procedure of a multimedia data recording method according to this embodiment.

As can be seen from this drawing, the multimedia data recording method according to this embodiment is composed of three stages. That is to say, when multimedia data is acquired, this data is stored divided into layers, and an index for managing the data hierarchically and data characteristics—that is, information on recording quality and so forth (actually, information specifying the protection level of each layer since division into layers is performed on a quality-byquality basis)—are also registered. Then, when an event occurs, the event data and pre-event data recording quality—more specifically, the layer protection level—is changed. Then, when the vacant capacity of memory M1 falls to or below a predetermined value, or after the elapse of a predetermined time, deletion is started from a low layer. Thus, data belonging to layers other than layers subject to protection is deleted.

Thus, according to this embodiment, when an event occurs, going back in time the rank of the layer in which pre-event data is stored is changed ex post facto, enabling data stored in this layer to be recorded for a long period and at high definition.

Moreover, with the above-described configuration, only the rank of a layer is changed in processing for long-duration recording of pre-event data, so that there is no need for a separate recording medium for saving pre-event data temporarily. The circuit scale of the data recording apparatus can thus be reduced.

Furthermore, with the above-described configuration, classification into a hierarchical layer is performed when surveillance data is recorded, and the rank of this layer can be changed ex post facto, enabling flexibility of data recording processing to be improved.

Embodiment 5

In this embodiment, a moving subject is tracked within video shot by a camera, and when the nature of movement of that moving subject matches a predetermined condition this is taken to be an event, and data recorded from back when movement started up to the present can be stored at high definition.

Figure 23:
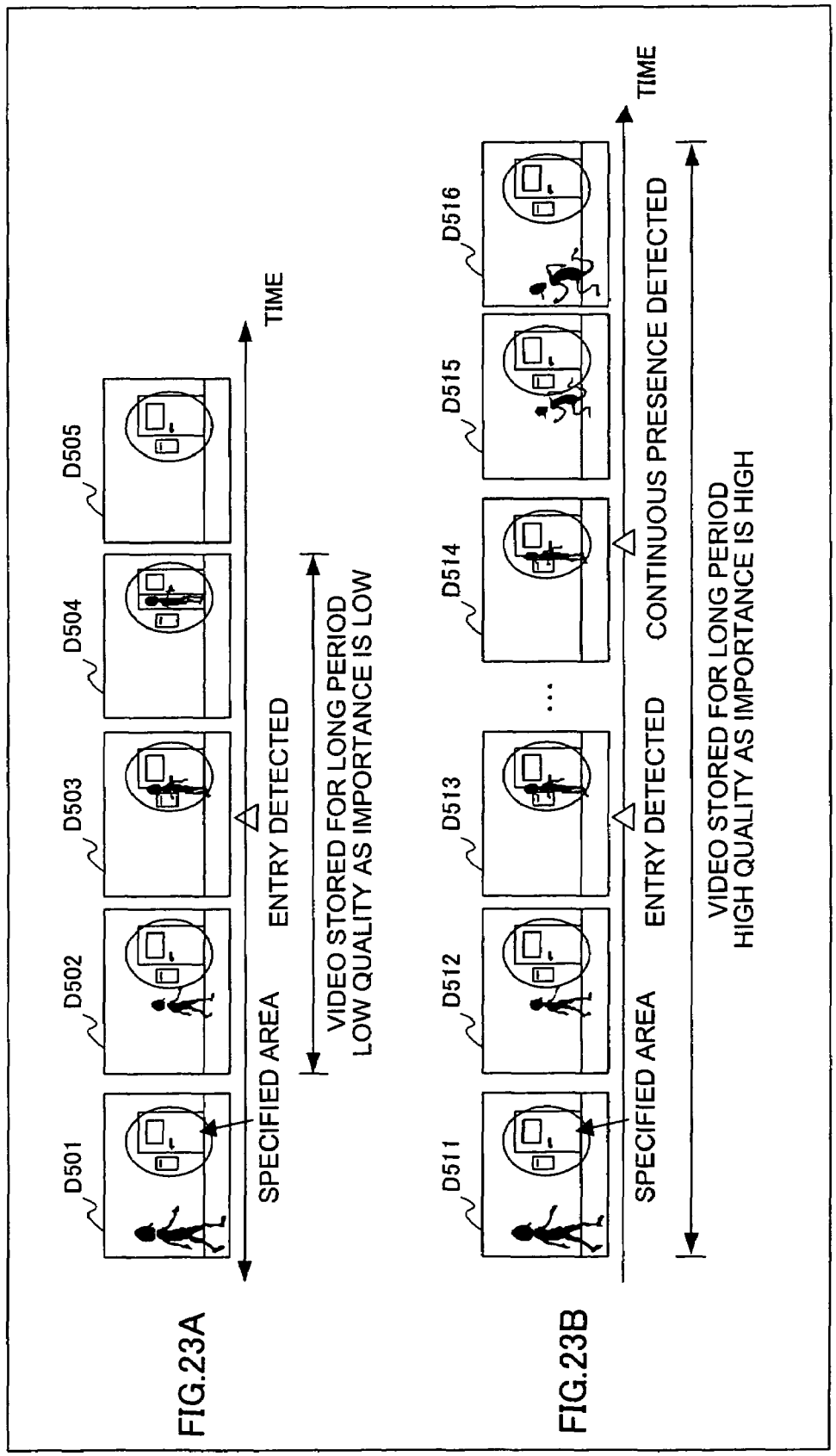
FIG. 23 is a drawing showing concrete examples of Embodiment 5.

To consider the concrete example of this embodiment shown in FIG. 23, for instance, in a surveillance system installed near the entrance to an apartment building, detecting a person showing suspicious behavior when entering an apartment and storing the video for that time at high definition enables the detailed behavior of the suspicious person to be confirmed ex post facto. Specifically, when a person being tracked enters a specified area, video data from immediately before entry until the person disappears is stored at low quality, and when a person being tracked remains in a specified area for a long period, video data from the person's appearance in the video until the person' disappearance from the video is stored at high quality.

Figure 24:
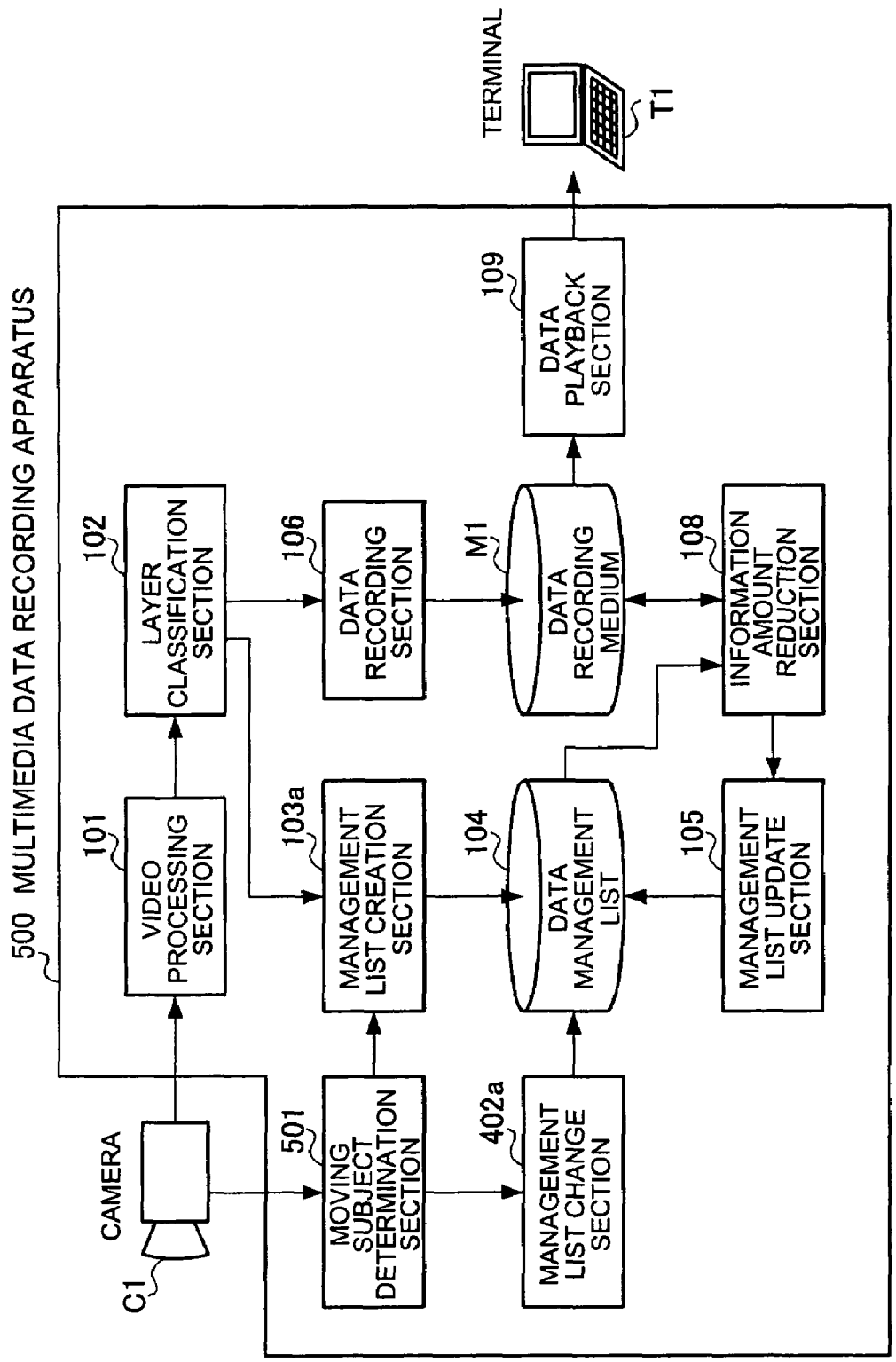
FIG. 24 is a block diagram showing the main configuration of a multimedia data recording apparatus according to Embodiment 5.

FIG. 24 is a block diagram showing the main configuration of a multimedia data recording apparatus 500 according to this embodiment. This multimedia data recording apparatus 500 has a similar basic configuration to multimedia data recording apparatus 400 shown in Embodiment 4 (see FIG. 19), and therefore identical configuration elements are assigned the same codes as in FIG. 19 and descriptions thereof are omitted. Also, in the case of configuration elements whose basic operation is the same but that differ slightly in detail, the same reference numbers are assigned with a lower-case letter appended, and additional description is provided as appropriate.

Multimedia data recording apparatus 500 has a moving subject determination section 501, and creates or changes data management list 104 according to the nature of the behavior of a moving subject. Moving subject determination section 501 tracks a moving subject within video shot by a camera, determines whether or not that moving subject is within a predetermined area, and furthermore, if that moving subject is within the predetermined area continuously, calculates the duration of that continuous presence.

Details of the determination made by moving subject determination section 501, and operations based on that determination, will now be described.

If moving subject determination section 501 determines that a moving subject is not present in the video, or is present but is not within a predetermined area, a management list creation section 103a creates a data management list 104 with the level indicating the importance of the segment to which frame data recorded by data recording section 106 belongs as "no level." By this means, data of all layers is deleted during data amount reduction, and the segment is completely deleted.

On the other hand, if it is determined by moving subject determination section 501 that there is a moving subject within the predetermined area, management list creation section 103a creates a data management list 104 with the level indicating segment importance raised. By this means, some layer data is deleted according to the level at the time of data amount reduction, and the overall segment data amount is reduced.

When it is determined by moving subject determination section 501 that a moving subject is within the predetermined area, and furthermore the time during which the moving subject has remained continuously exceeds a predetermined time, management list creation section 103a sets the level indicating the importance of segments to be recorded thereafter to the highest level, and creates a data management list 104. Also, management list change section 402a changes data management list 104 so that the level indicating the importance of segments recorded from back when tracking of the moving subject started up to the present is made the highest level. By this means, all layers are saved, and not erased, for all segments from the start of tracking of the moving subject until tracking ends.

Figure 25:
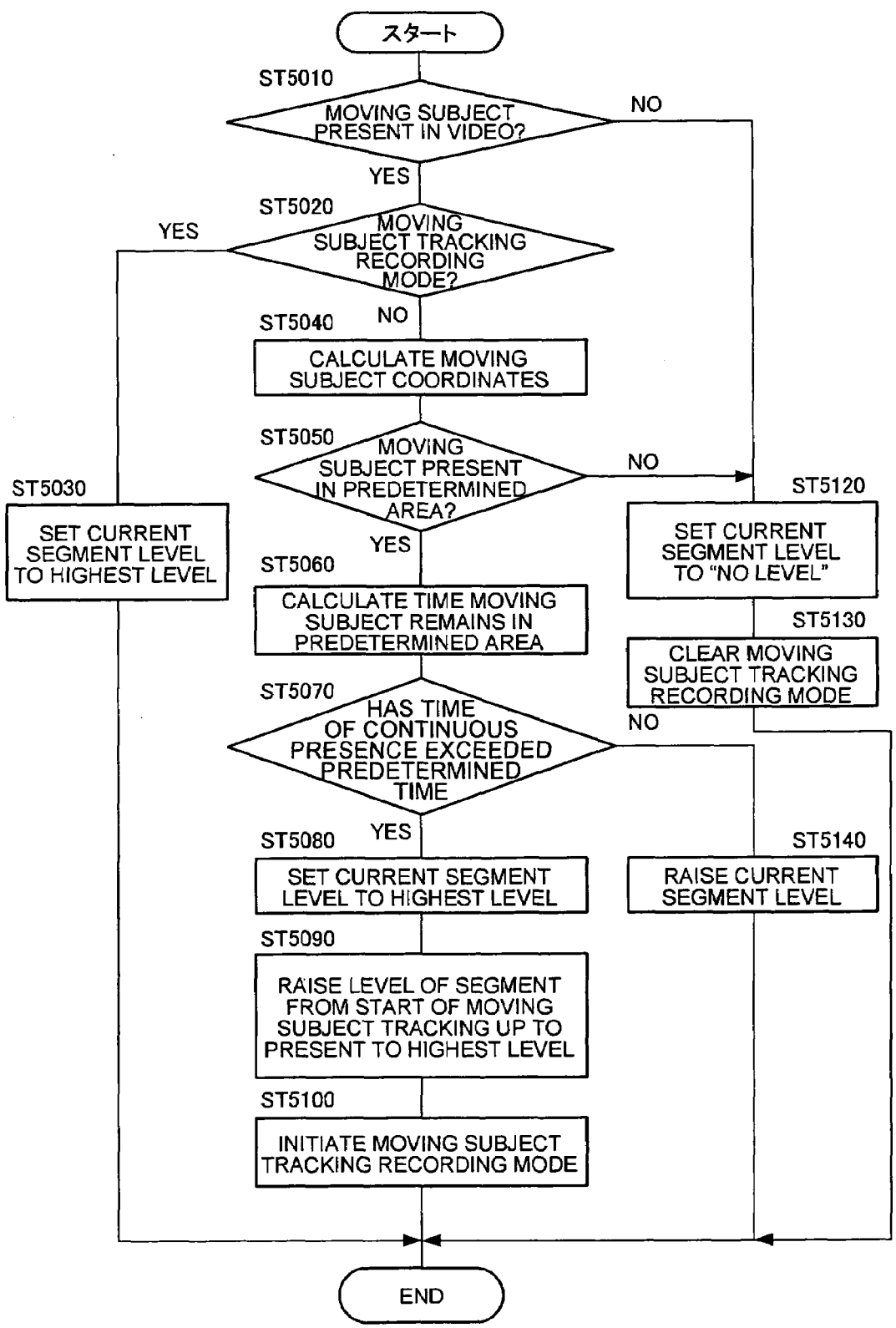
FIG. 25 is a flowchart showing the processing procedure of a moving subject determination section according to Embodiment 5.

The detailed processing procedure of moving subject determination section 501 will now be described using the flowchart shown in FIG. 25.

Moving subject determination section 501 first determines whether or not a moving subject is present in the video shot by surveillance camera C1 (ST5010). For example, memory is provided in which immediately preceding frame data is stored constantly, a difference comparison is performed between the immediately preceding frame in memory and the current frame, and if the difference in brightness values exceeds a predetermined threshold, it is determined that a moving subject is present. Furthermore, the certainty of the moving subject being a person may be increased based on the size and shape of the difference area, and continuity of movement in a comparison of preceding and succeeding frames. Next, if a moving subject is present in the video, it is confirmed whether or not the current mode is moving subject tracking recording mode (ST5020). Moving subject tracking recording mode denotes a state in which a moving subject is continuously present in a predetermined area for a predetermined time. If moving subject tracking recording mode is confirmed, notification is given to management list creation section 103a to create a data management list 104 with the level indicating the importance of the current segment made the highest level (ST5030).

On the other hand, if the mode is determined not to be moving subject tracking recording mode in ST5020, moving subject coordinates are calculated (ST5040). Moving subject coordinates are the coordinates of the barycenter of the aforementioned difference area. It is then determined whether or not the moving subject is within the predetermined area (ST5050). The predetermined area is an area in which the object of surveillance such as a bank entrance or an ATM is present, and is selected by the surveillance operative beforehand on a monitor screen. If the moving subject is within the predetermined area, the time during which the moving subject is present continuously within the predetermined area is calculated (ST5060), and it is determined whether or not the duration of that continuous presence exceeds a predetermined time (ST5070). If the duration of continuous presence exceeds the predetermined time, notification is given to management list creation section 103a to create a data management list 104 with the level indicating the current importance made the highest level (ST5080).

Furthermore, notification is given to management list change section 402a to change the segment level from the time when a moving subject was first determined to be present in the video (the moving subject tracking start time) up to the present to the highest level (ST5090). Then moving subject tracking recording mode is initiated in order to make the level of data management list 104 segments to be created subsequently the highest level (ST5100). If it is determined in ST5070 that the duration of continuous presence has not exceeded the predetermined time, notification is given to management list creation section 103a to raise the current segment level (ST5140).

On the other hand, if it is determined in ST5050 that a moving subject is not present within the predetermined area, or if it is determined in ST5010 that a moving subject is not present in the video, notification is given to management list creation section 103a to set the current segment level to "no level" (ST5120), and moving subject tracking recording mode is cleared (ST5130).

The processing procedure for data amount reduction is similar to that in Embodiment 3, and therefore a description thereof will be omitted here.

FIG. 26 through FIG. 33 are series of drawings for explaining concrete examples of a data hierarchical structure composed of segments and layers. FIG. 28 through FIG. 33 are drawings showing the actual configuration of data that manages individual segments.

Figure 26:
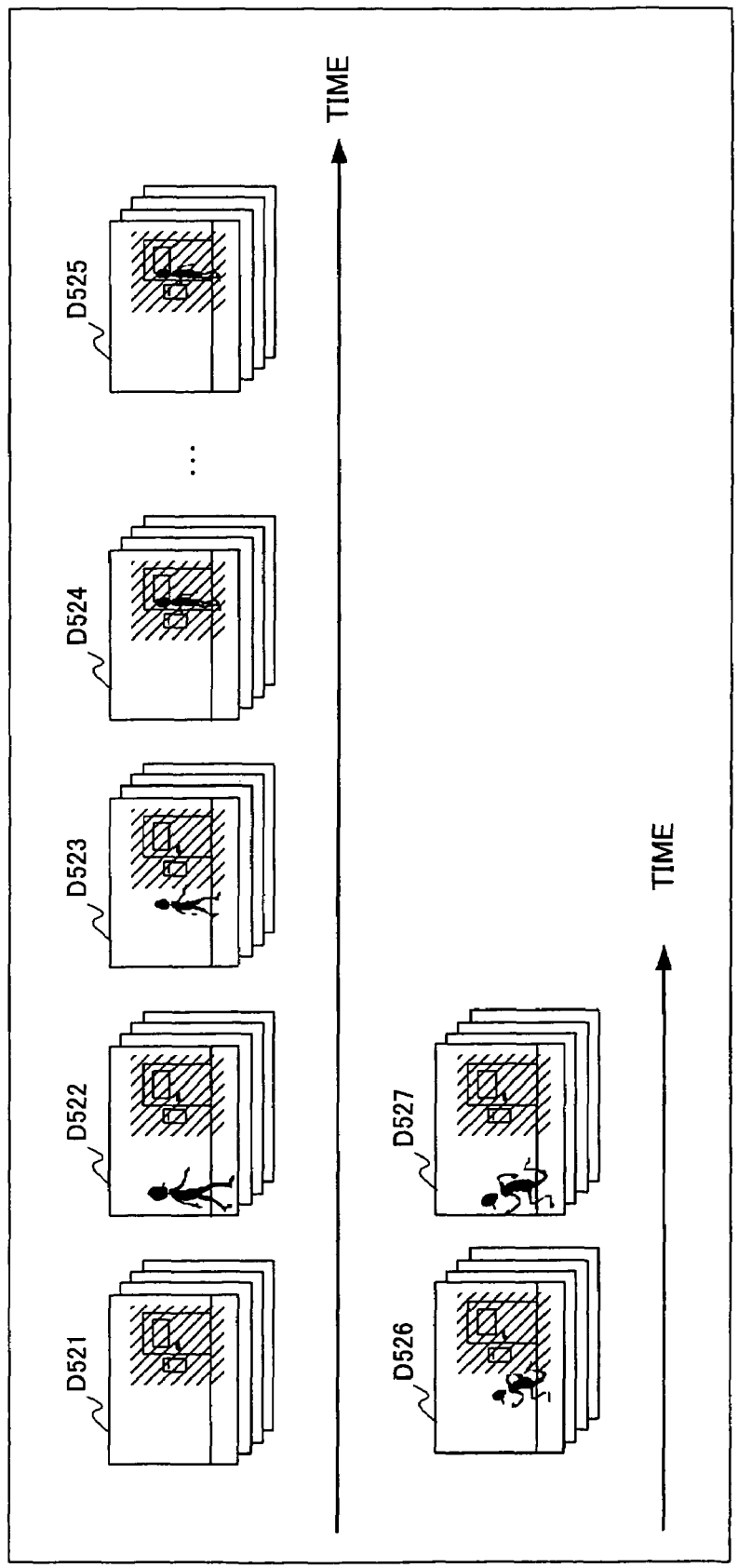
FIG. 26 is a series of drawings for explaining a concrete example of a data hierarchical structure composed of segments and layers.

For example, if reference numbers are assigned as shown in FIG. 26 to surveillance data of scenes of the same kind as shown in FIG. 23, information indicating the characteristics of each data is as shown in FIG. 27, according to whether or not there is a moving subject and whether or not there is event occurrence. As shown in this drawing, the presence of an intruder is detected in D524, and the fact that the duration of continuous presence of the intruder has exceeded the predetermined time is detected in D525.

Figure 29:
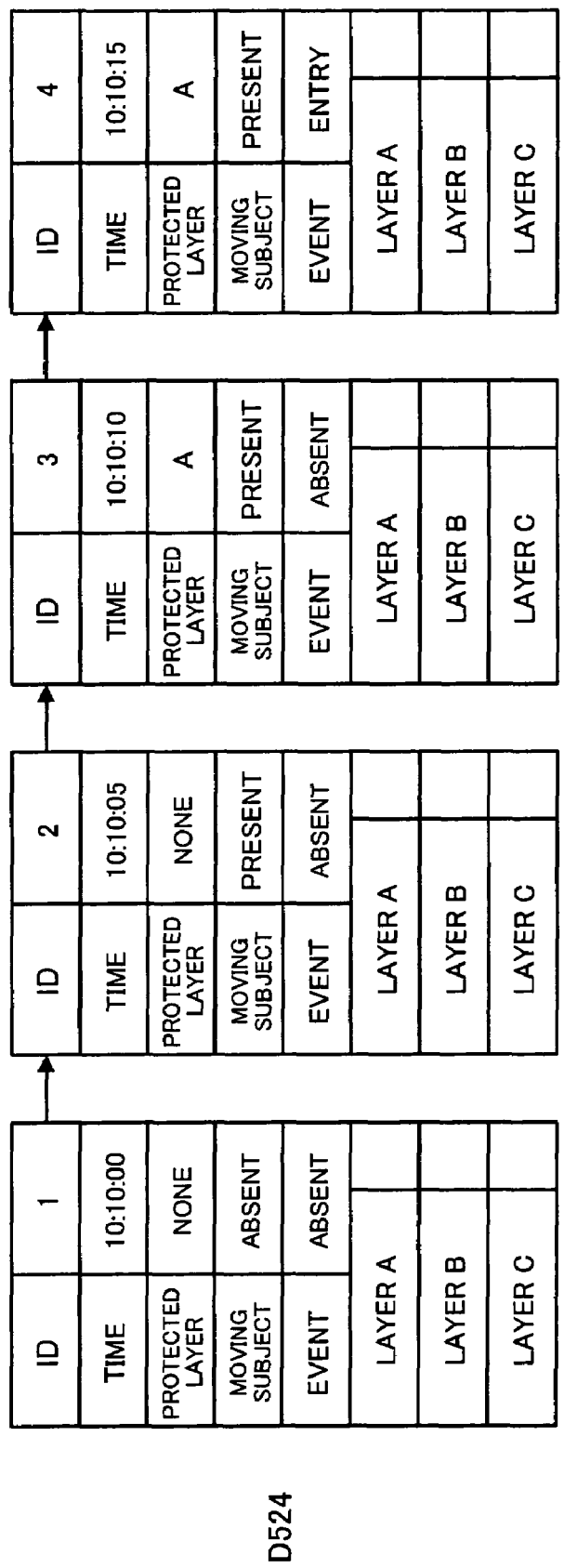
FIG. 29 is a series of drawings for explaining a concrete example of a data hierarchical structure composed of segments and layers.
Figure 30:
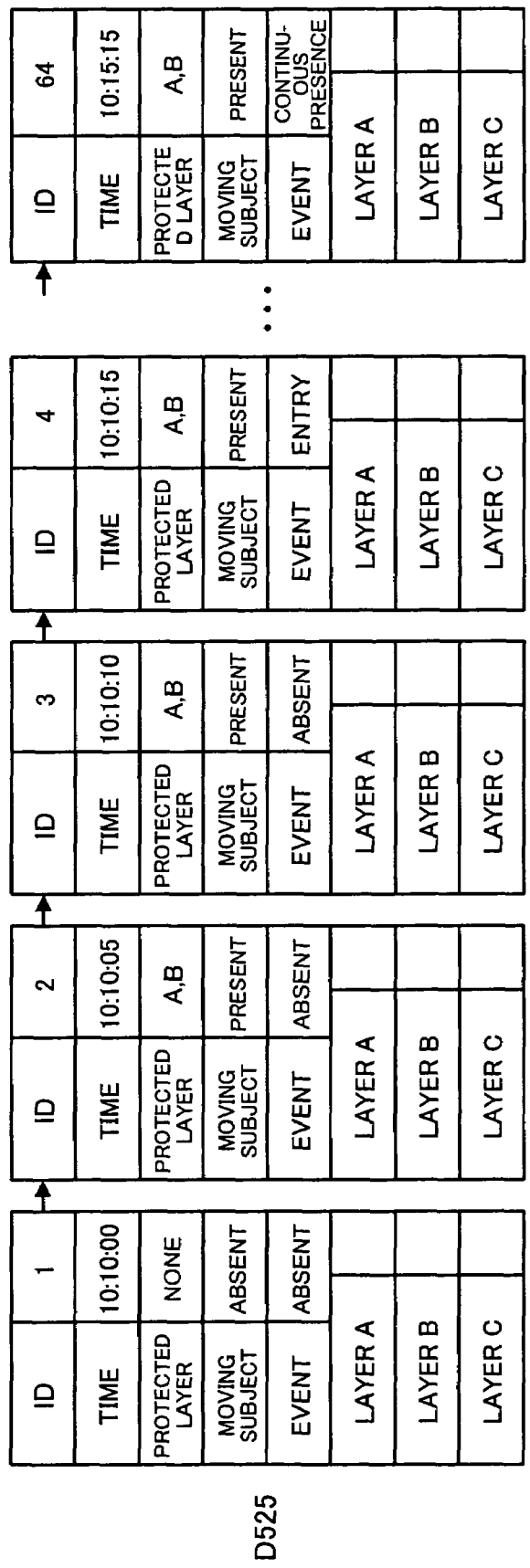
FIG. 30 is a series of drawings for explaining a concrete example of a data hierarchical structure composed of segments and layers.

As shown in FIG. 28, in data D521 through D523 "none" is entered as the protected layer entry as there is no event. Also, as shown in FIG. 29, in data D524 the protected layer is changed to A from the segment 5 seconds before since there is an intrusion event. Furthermore, as shown in FIG. 30, in data D525 the protected layers of "moving subject present" segments are changed to "A, B".

Figure 31:
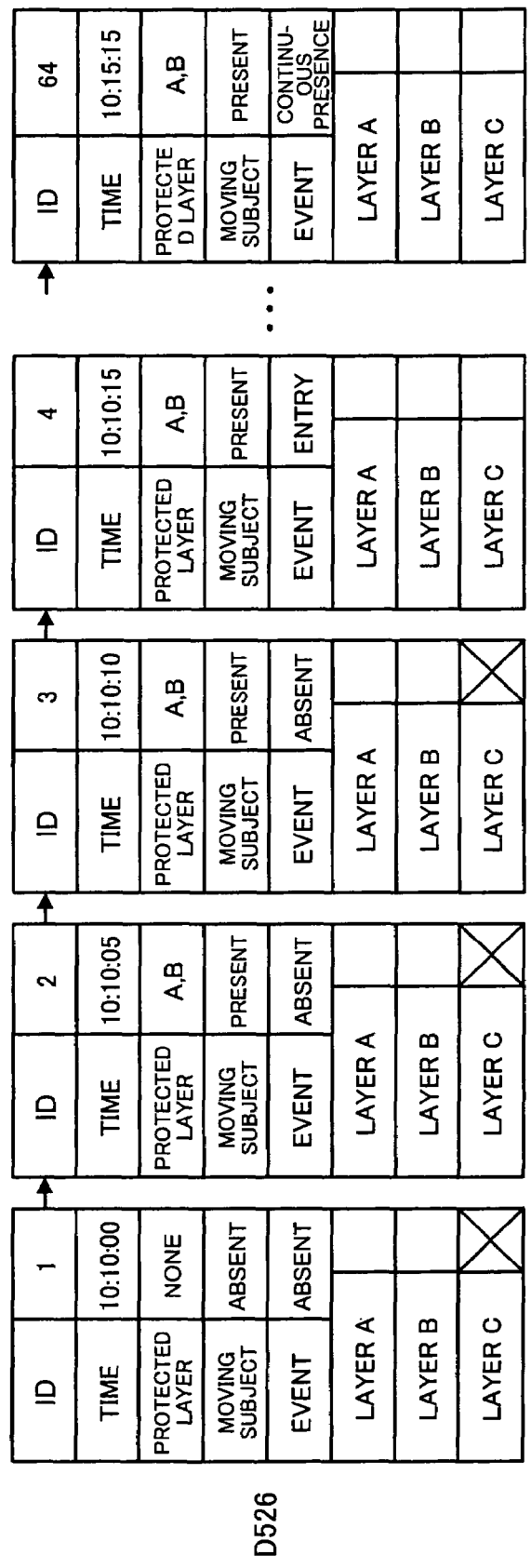
FIG. 31 is a series of drawings for explaining a concrete example of a data hierarchical structure composed of segments and layers.
Figure 32:
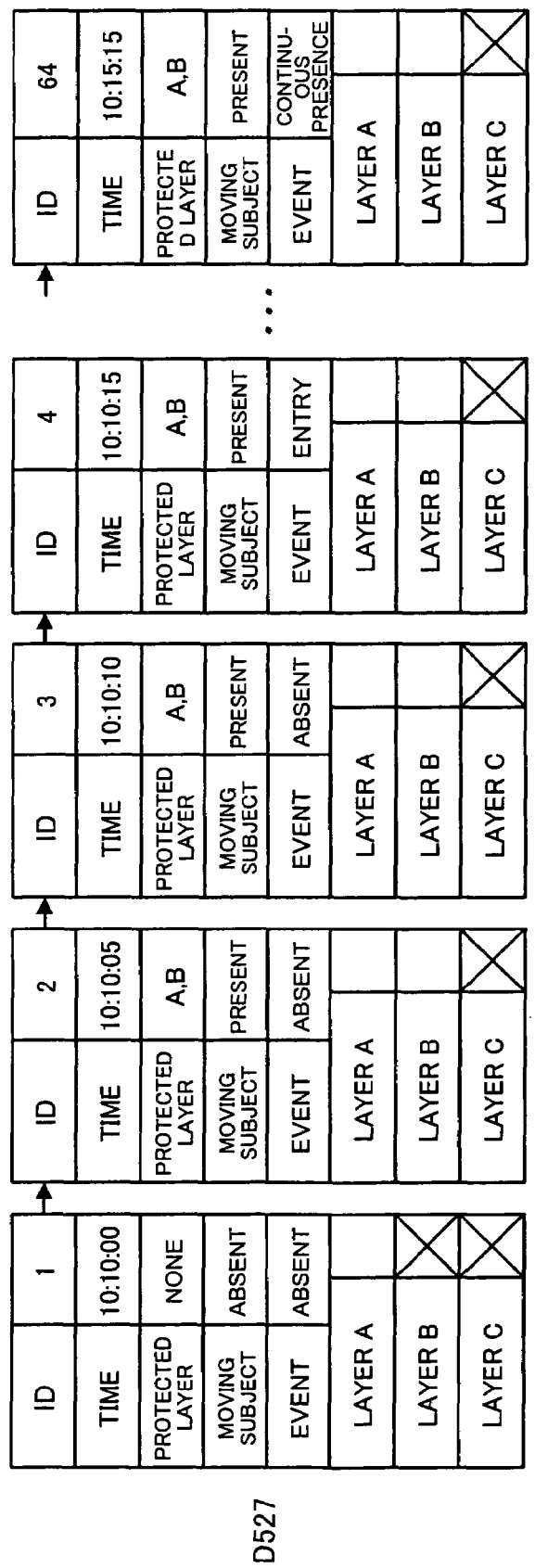
FIG. 32 is a series of drawings for explaining a concrete example of a data hierarchical structure composed of segments and layers.

On the other hand, as shown in FIG. 31, in D526 data belonging to the lowest layer that is not a protected layer (layer C) is deleted. Also, as shown in FIG. 32, in D527 all layers C are deleted, and therefore layer B of the ID=1 segment is deleted next. Lastly, in D528 layer A of the ID=1 segment is deleted, and all layers of the ID=1 segment are deleted, and therefore the management data of the ID=1 segment is deleted.

Thus, according to this embodiment, it is possible for video in which there is no moving subject to be stored only temporarily, for video at the time when a moving subject enters a predetermined area to be stored as low-resolution video, and furthermore, when the moving subject remains in the predetermined area for a predetermined time or longer, for the entire video from the appearance to the disappearance of the moving subject to be stored as high-resolution video.

By this means, when a predetermined area setting is made for the entrance of a high-security room where personal verification (input of a personal identification number or the like) is implemented upon entry, for example, video of a person entering smoothly can be stored at a resolution sufficient to be able to identify the person, and video of a person who takes time to enter can be stored at high resolution that enables the face and movements of the person to be checked in detail.

Embodiment 6

In this embodiment, video played back frequently can be stored at high definition, video not played back so much can be stored with the amount of data reduced, and video not played back at all can be completely deleted.

Figure 34:
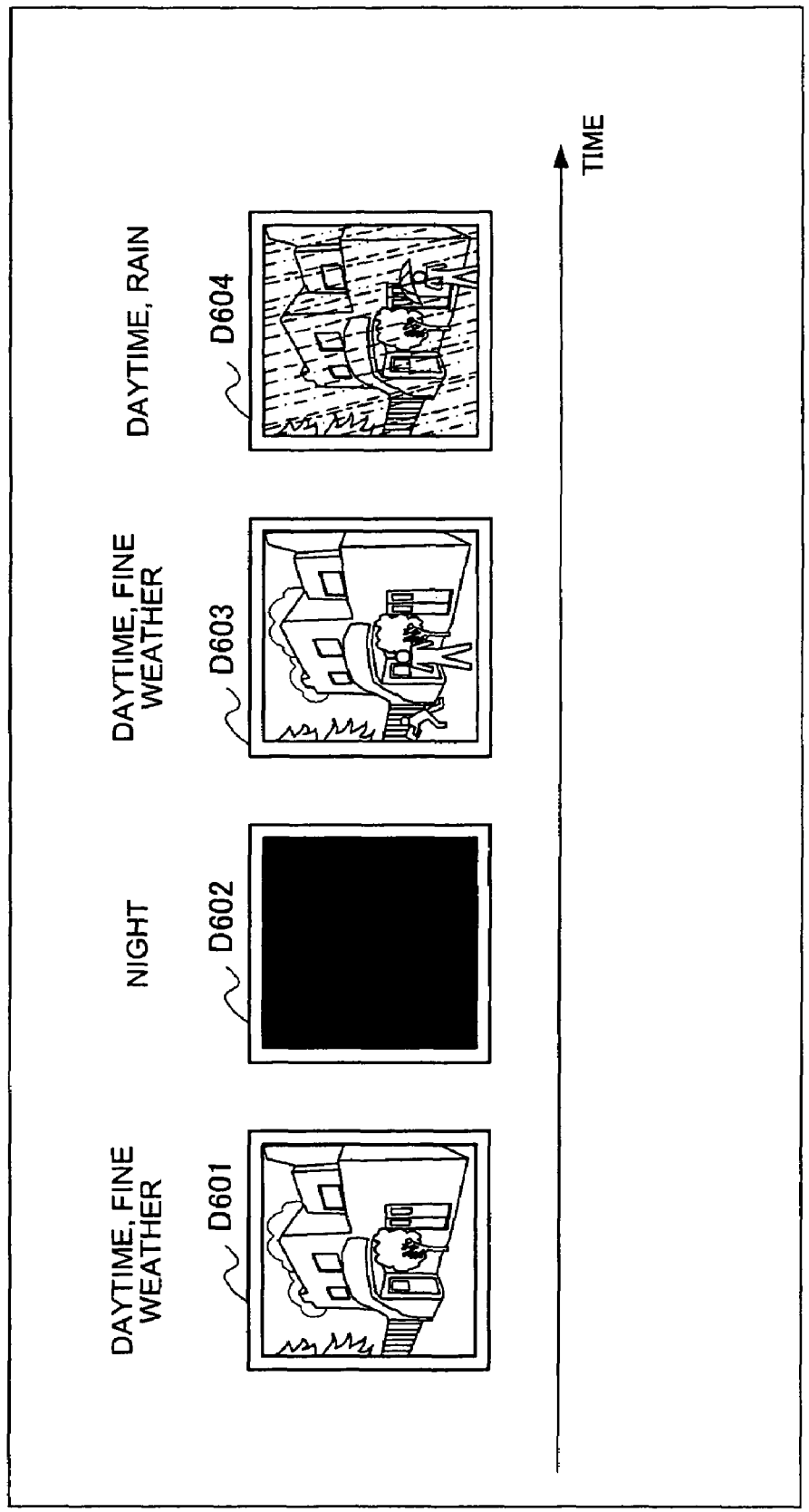
FIG. 34 is a drawing showing a concrete example of Embodiment 6.

For example, to consider the concrete example of this embodiment shown in FIG. 34, in a monitoring system in which not only real-time video shot by a camera installed in a sightseeing area or the like, but also recorded past video, can be displayed on a PC or mobile terminal via the Internet or the like, video for which there are many requests for playback by the user—in FIG. 34, for example, video shot under bright conditions of daylight and fine weather (D601) or video shot when an event of some kind is in progress (D603)—is highly likely to be played back subsequently, and is therefore stored at high definition. On the other hand, video that is not played back by the user at all—in FIG. 34, for example, video shot at night (D602) or video shot in the daytime but when it is raining (D604)—will represent simply a waste of recording capacity if stored, and therefore is subjected to either reduction of the amount of data or complete deletion, thereby securing capacity for recording newly shot video.

Figure 35:
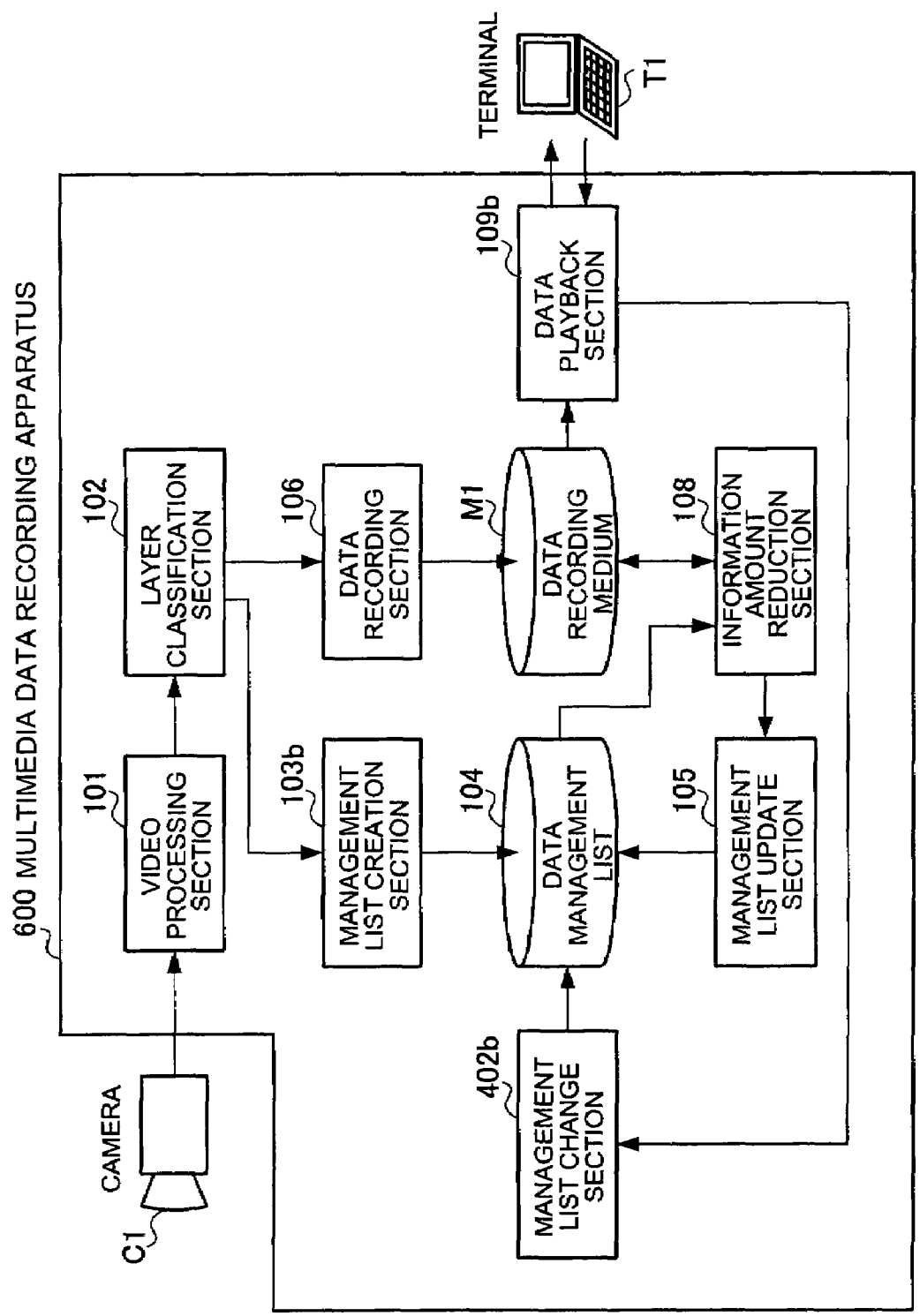
FIG. 35 is a block diagram showing the main configuration of a multimedia data recording apparatus according to Embodiment 6.

FIG. 35 is a block diagram showing the main configuration of a multimedia data recording apparatus 600 according to this embodiment. This multimedia data recording apparatus 600 has a similar basic configuration to multimedia data recording apparatus 400 shown in Embodiment 4 (see FIG. 19), and therefore identical configuration elements are assigned the same codes as in FIG. 19 and descriptions thereof are omitted. Also, in the case of configuration elements whose basic operation is the same but that differ slightly in detail, the same reference numbers are assigned with a lower-case letter appended, and additional description is provided as appropriate.

In multimedia data recording apparatus 600, a data playback section 109b reads data from recording medium M1, plays back this data via display terminal T1, and also reports this data to a management list change section 402b, and management list change section 402b finds the segment corresponding to the played-back data from data management list 104, and raises the level indicating the importance of that segment.

The processing procedure of multimedia data recording apparatus 600 will now be described.

A management list creation section 103b creates a data management list 104 with the level indicating the importance of the segment to which frame data recorded by data recording section 106 belongs as "no level." By this means, the relevant segment undergoes deletion of data of all layers during data amount reduction, and is completely deleted.

Data playback section 109b reads the relevant data from recording medium M1 in accordance with a video playback request from the user, and also sends identification information for the read data (frame number or time information) to management list change section 402*b*. Based on this identification information, management list change section 402*b* finds the segment to which the read data belongs from data management list 104. In data management list 104 the number of playback times is stored on a segment-by-segment basis, and the number of playback times of the found segment is totaled. If the number of playback times exceeds a predetermined numeric value at this time, the level indicating the importance of the aforementioned segment is raised by 1.

The processing procedure for data amount reduction is similar to that in Embodiment 3, and therefore a description thereof will be omitted here.

Figure 36:
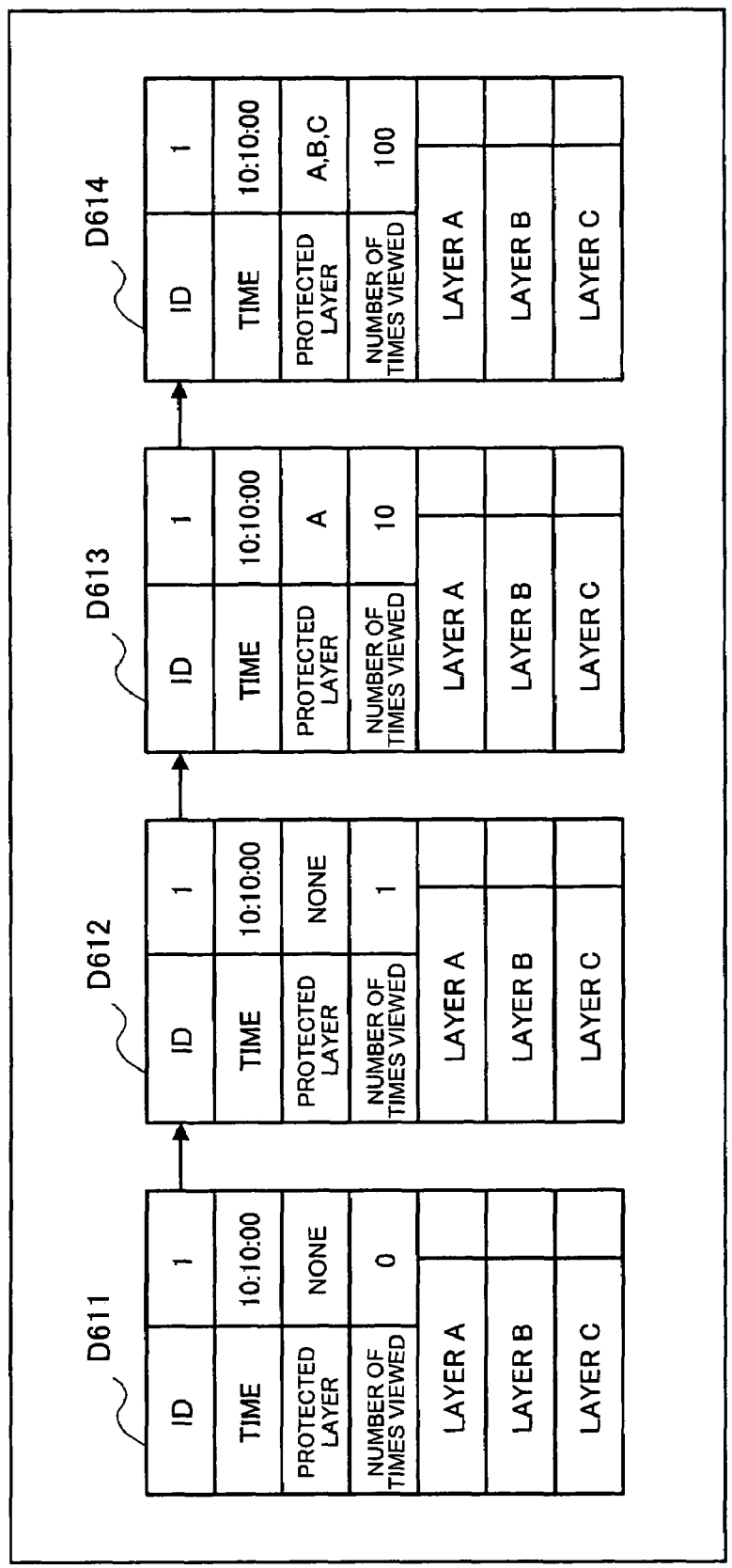
FIG. 36 is a drawing showing a concrete example of the structure of data recorded in accordance with a multimedia data recording method according to Embodiment 6.

FIG. 36 is a drawing showing a concrete example of the structure of data recorded in accordance with a multimedia data recording method according to this embodiment.

D611 is management data when video is stored. In D612, there is a viewing request for stored video, and therefore the number of times viewed is totaled. In D613, the number of times viewed exceeds a predetermined threshold, and therefore A is added to the layers subject to protection. In D614, the number of times viewed further increases, and the layers subject to protection increase. Details are the same as for the data structure described in other embodiments, and are therefore omitted here.

Thus, according to this embodiment, the greater the number of playback requests from a user the higher is the definition used for storing recorded video, and video for which there are no playback requests at all from a user can be deleted or stored at low definition, enabling a recording method to be provided that responds to user needs.

It is also possible for the final playback time to be stored in data management list 104, and for management list change section 402 to be changed so that, even for a segment with a large number of playback times, the level indicating the importance of the relevant segment is lowered by 1 or changed to "no level" if a predetermined time or longer has elapsed since the last playback.

By this means, video for which there have been many playback requests from the user but for which there has been no playback request for a long period can be regarded as unnecessary video, and deleted or stored with its definition lowered.

Embodiment 7

In this embodiment, from among a plurality of videos shot and recorded at different times under the same conditions of camera location and direction, one video matching a predetermined condition can be stored at high definition while the other videos are stored with the amount of data reduced.

Figure 37:
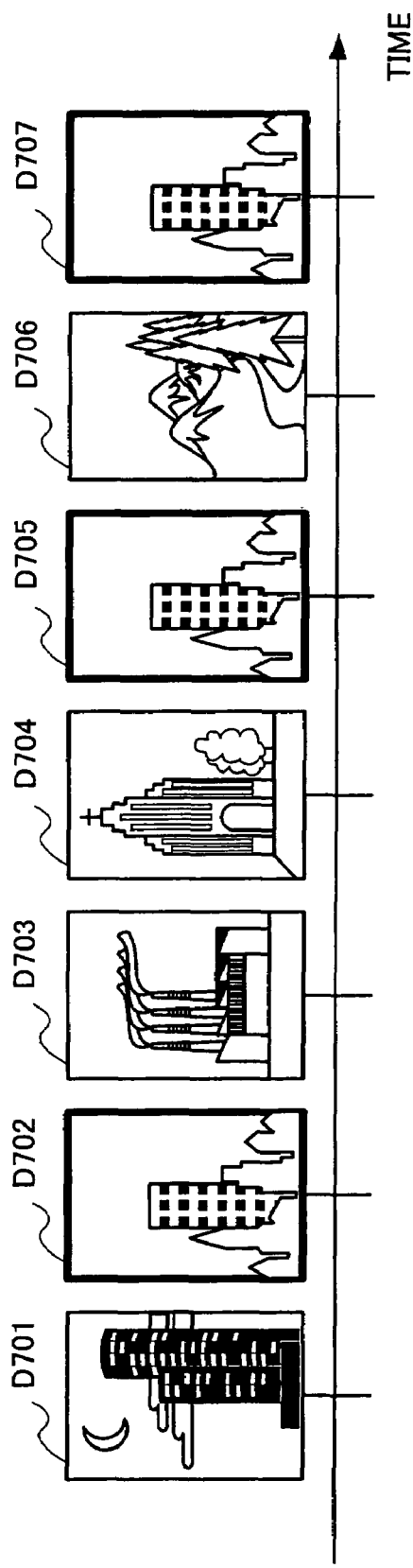
FIG. 37 is a drawing showing a concrete example of Embodiment 7.

For example, to consider the concrete example of this embodiment shown in FIG. 37, with regard to videos shot with a digital still camera, video camera, or the like, in sightseeing areas, a plurality of recorded videos (D702, D705, D707) shot and recorded under the same shooting conditions (camera location, direction, and so forth) are designated as "video with duplicated content", and of these videos, most recent video D707 is always stored as high-quality video, while D702 and D705 are stored with the amount of data reduced in proportion to how far back they are in the past. Reducing the amount of data of video with duplicated content prior to storage in this way enables a large amount of video of various content to be stored.

Figure 38:
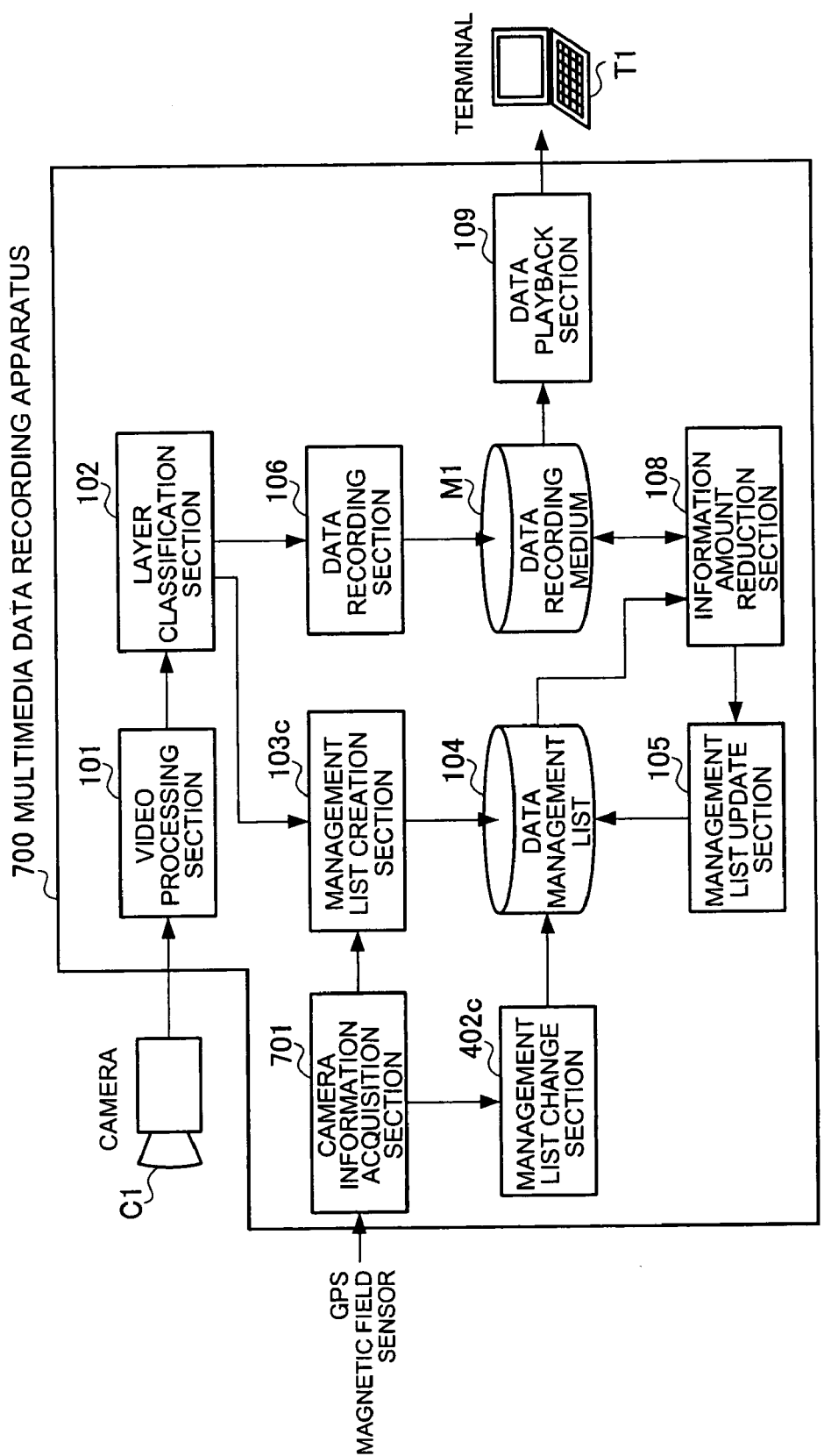
FIG. 38 is a block diagram showing the main configuration of a multimedia data recording apparatus according to Embodiment 7.

FIG. 38 is a block diagram showing the main configuration of a multimedia data recording apparatus 700 according to this embodiment. This multimedia data recording apparatus 700 has a similar basic configuration to multimedia data recording apparatus 400 shown in Embodiment 4 (see FIG. 19), and therefore identical configuration elements are assigned the same codes as in FIG. 19 and descriptions thereof are omitted. Also, in the case of configuration elements whose basic operation is the same but that differ slightly in detail, the same reference numbers are assigned with a lower-case letter appended, and additional description is provided as appropriate.

Multimedia data recording apparatus 700 has a camera information acquisition section 701, acquires camera information comprising the camera shooting location obtained by means of GPS or the like and the camera shooting direction obtained by means of a magnetic field sensor or the like, stores this together with video shot by the camera, and if video that has the same camera information has been stored in the past, reduces the amount of data of video with an older time of recording since duplicate storage has been performed of video with the same content.

The processing procedure of multimedia data recording apparatus 700 will now be described.

In this embodiment, a group of frames shot and recorded consecutively with the same camera attributes are treated as data of one segment. Camera attribute information is entered in data management list 104 on a segment-by-segment basis.

Camera information acquisition section 701 periodically acquires camera information comprising the camera shooting location obtained by means of GPS or the like and the camera shooting direction obtained by means of a magnetic field sensor or the like, and if either the shooting location or the shooting direction in the acquired shooting information is different from that acquired the previous time, notifies a management list creation section 103*c* that there has been a change in the camera information, and also sends camera attribute information to a management list change section 402*c*.

On receiving notification that the camera information has changed from camera information acquisition section 701, management list creation section 103*c* creates a data management list 104 so that subsequently recorded frame data belongs to a different new segment, and also sets the level indicating the importance of that segment to the highest level. By this means, unless there is a subsequent change in level, all subsequent layers are saved, and not deleted, for that segment.

On receiving camera information from camera information acquisition section 701, management list change section 402*c* finds a segment for which the same shooting location and shooting direction are stored as in that camera information from data management list 104, and also lowers the level indicating the importance of the found segment by 1, or sets "no level" if the lowest level is already set.

Figure 39:
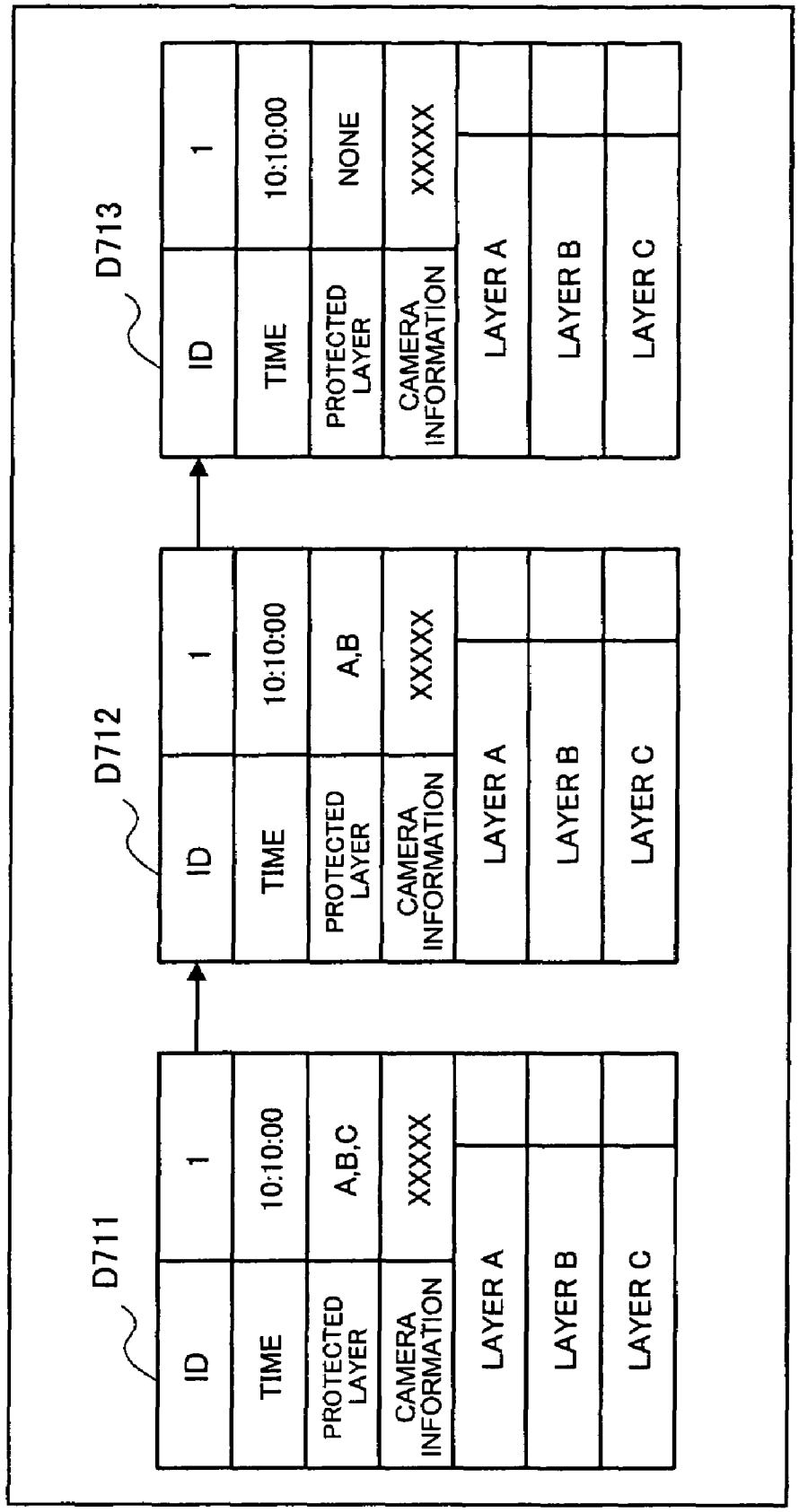
FIG. 39 is a drawing showing a concrete example of the structure of data recorded in accordance with a multimedia data recording method according to Embodiment 7.

FIG. 39 is a drawing showing a concrete example of the structure of data recorded in accordance with a multimedia data recording method according to this embodiment.

In D711, all layers (A through C) are made subject to protection when video storage is performed. Then, in D712, when video (a segment) that has the same camera information is stored, layer C is removed from the layers subject to protection. Furthermore, in D713, when video that has the same camera information is stored numerous times, the indication of layers subject to protection is changed to "none." Details are the same as for the data structure previously described in other embodiments, and are therefore omitted here.

Thus, according to this embodiment, from among a plurality of videos shot and recorded using the same camera location and direction, the most recent video is stored at high definition, other video is stored with data amount reduction performed in proportion to how far back in the past that video is, and video further in the past is deleted. By this means, a user can be spared the time and trouble of manually finding and deleting video with the same content, and a large amount of video shot at various locations can be stored.

This concludes the descriptions of the embodiments of the present invention.

A multimedia data recording apparatus and multimedia data recording method according to the present invention are not limited to the above-described embodiments, and various variations and modifications may be possible without departing from the scope of the present invention. For example, it is possible to implement the present invention by combining embodiments as appropriate.

Also, in the above description, a case has been described by way of example in which a multimedia data recording apparatus according to the present invention is applied to a surveillance system—that is, the apparatus records surveillance data—but the object of recording is not limited to this.

Furthermore, a case has here been described by way of example in which the present invention is configured by means of hardware, but it is also possible for the present invention to be implemented by means of software.

The present application is based on Japanese Patent Application No. 2003-360012 filed on Oct. 20, 2003, and Japanese Patent Application No. 2004-306093 filed on Oct. 20, 2004, the entire content of which is expressly incorporated by reference herein.

INDUSTRIAL APPLICABILITY

A multimedia data recording apparatus according to the present invention enables data to be recorded for a long period by means of a simple configuration and simple processing without imposing a heavy load on the system, and is thus suitable for use in a surveillance system or the like.

The invention claimed is:

1. A monitoring system comprising:
  a multimedia data recording apparatus comprising:
    a layer classifier that classifies multimedia data into a plurality of hierarchical layers according to data contents or data precision;
    a recorder that continuously records data classified into said layers in a memory; and
    a data amount reducer that, when vacant capacity of said memory is at or below a threshold value, performs deletion in an order starting with data classified into a lower layer of said hierarchical layers among data recorded in said memory;
  said monitoring system further comprising:
    a measurer that measures frequency of access to data recorded in said memory; and
    a changer that changes at least one or a plurality of layers in which data whose frequency of access is greater than or equal to a predetermined value among data recorded in said memory to a protected layer that is not subject to data amount reduction by said data amount reducer.

2. The monitoring system according to claim 1, wherein said layer classification section classified said multimedia data into a plurality of hierarchical layers according to frame rate, required image quality or resolution, image variation amount between frames, required storage time, MPEG (Moving Picture Experts Group) data picture type, importance of a recorded event, or an enhancement layer of data coded by an MPEG scalable coding method.

3. The monitoring system according to claim 1, wherein said data amount reducer performs deletion in an order starting with older data among data or less important data recorded in a lower layer.

4. The monitoring system according to claim 3, wherein said data amount reducer does not delete data that has not passed a minimum storage time among data recorded in a lower layer.

5. The monitoring system according to claim 1, wherein:
  said layer classifier sets said multimedia data in a plurality of segments according to a time of acquisition of the data and then classifies said multimedia data into said layers for each said segment; and
  said data amount reducer selects a segment whose said time of acquisition is older, and performs deletion in an order starting with data recorded in a lower layer within the segment.

* * * * *